(12) United States Patent
Whisnant

(10) Patent No.: US 9,965,792 B2
(45) Date of Patent: May 8, 2018

(54) PICKS API WHICH FACILITATES DYNAMICALLY INJECTING CONTENT ONTO A WEB PAGE FOR SEARCH ENGINES

(71) Applicant: Dell Products L.P., Round Rock, TX (US)

(72) Inventor: Rodney T. Whisnant, Austin, TX (US)

(73) Assignee: Dell Products L.P., Round Rock, TX (US)

(*) Notice: Subject to any disclaimer, the term of this patent is extended or adjusted under 35 U.S.C. 154(b) by 899 days.

(21) Appl. No.: 13/891,710

(22) Filed: May 10, 2013

(65) Prior Publication Data

US 2014/0337164 A1  Nov. 13, 2014

(51) Int. Cl.
  *G06Q 30/06* (2012.01)

(52) U.S. Cl.
  CPC .................. *G06Q 30/0631* (2013.01)

(58) Field of Classification Search
  CPC ........................................ G06Q 30/00
  See application file for complete search history.

(56) References Cited

U.S. PATENT DOCUMENTS

| | | |
|---|---|---|
| 6,321,221 B1 | 11/2001 | Bieganski |
| 7,647,309 B1 | 1/2010 | Bar |
| 7,689,432 B2 | 3/2010 | Gross |
| 7,818,399 B1 | 10/2010 | Ross, Jr. et al. |
| 8,244,848 B1 | 8/2012 | Narayanan et al. |
| 8,543,457 B2 | 9/2013 | Staib et al. |
| 8,667,064 B2* | 3/2014 | Zuckerberg ....... G06F 17/30867 705/39 |
| 8,935,604 B2 | 1/2015 | DeHaven et al. |
| 9,256,902 B2* | 2/2016 | Chateau-Artaud  G06Q 30/0631 |
| 9,538,149 B2* | 1/2017 | Williams .......... G06F 17/30017 |
| 2002/0010625 A1 | 1/2002 | Smith et al. |
| 2005/0044485 A1 | 2/2005 | Mondry et al. |
| 2005/0204276 A1* | 9/2005 | Hosea ............... G06F 17/30905 715/205 |

(Continued)

OTHER PUBLICATIONS

Anonymous, Display Ad 13—No Title, Apr. 10, 1894, New York Times (1857-1922).

(Continued)

*Primary Examiner* — Kathleen Palavecino
*Assistant Examiner* — Abby J Flynn
(74) *Attorney, Agent, or Firm* — Terrile, Cannatti, Chambers & Holland, LLP

(57) ABSTRACT

A system and method are disclosed automating the provision of social media product recommendations in an electronic commerce environment. A search engine submits a request for product-related content, such as a product page, to a merchant web server. In turn, the merchant web server submits a server-side request to a search engine optimization (SEO) application programming interface (API) for processing. In response, the SEO API returns Picks markup content that is associated with the requested product-related content. The merchant web server then combines the requested product-related content with the returned Picks markup content to generate a product page. The product page, which includes the dynamically injected Picks markup content, is then returned to the search engine where it is indexed.

21 Claims, 23 Drawing Sheets

(56) References Cited

U.S. PATENT DOCUMENTS

| | | | |
|---|---|---|---|
| 2007/0033532 A1 | 2/2007 | Lemelson | |
| 2008/0133724 A1 | 6/2008 | Clark | |
| 2008/0243632 A1* | 10/2008 | Kane | G06F 17/30867 705/14.66 |
| 2008/0281834 A1* | 11/2008 | Wu | G06F 17/30861 |
| 2008/0306807 A1 | 12/2008 | Amento et al. | |
| 2009/0043674 A1 | 2/2009 | Minsky et al. | |
| 2009/0265251 A1 | 10/2009 | Dunlap et al. | |
| 2009/0299981 A1* | 12/2009 | Nagasaka | G11B 27/034 |
| 2010/0030578 A1 | 2/2010 | Siddique et al. | |
| 2010/0131384 A1 | 5/2010 | Chen et al. | |
| 2010/0191582 A1* | 7/2010 | Dicker | G06Q 30/02 705/14.51 |
| 2010/0321405 A1 | 12/2010 | MacInnes et al. | |
| 2011/0066497 A1 | 3/2011 | Gopinath et al. | |
| 2011/0093361 A1 | 4/2011 | Morales | |
| 2011/0099523 A1 | 4/2011 | van Zee et al. | |
| 2011/0202400 A1 | 8/2011 | Bedard et al. | |
| 2011/0252343 A1 | 10/2011 | Broman et al. | |
| 2011/0264736 A1* | 10/2011 | Zuckerberg | G06Q 30/02 709/204 |
| 2011/0320276 A1 | 12/2011 | Ray et al. | |
| 2012/0311623 A1* | 12/2012 | Davis | H04N 5/765 725/18 |
| 2013/0067585 A1 | 3/2013 | Sterland et al. | |
| 2013/0139073 A1 | 5/2013 | Crames et al. | |
| 2013/0191372 A1 | 7/2013 | Lee et al. | |
| 2013/0219520 A1 | 8/2013 | Atkinson et al. | |
| 2013/0260727 A1* | 10/2013 | Knudson | G06Q 30/00 455/414.1 |
| 2013/0290110 A1 | 10/2013 | Luvogt et al. | |
| 2014/0089135 A1 | 3/2014 | Linh et al. | |
| 2014/0095463 A1 | 4/2014 | Pappas | |
| 2014/0149259 A1 | 5/2014 | Grace et al. | |
| 2014/0164401 A1 | 6/2014 | Kyaw et al. | |
| 2014/0207609 A1 | 7/2014 | Earhart et al. | |
| 2014/0258063 A1 | 9/2014 | Chourasia et al. | |
| 2014/0279197 A1 | 9/2014 | Ainsworth, III et al. | |
| 2014/0280054 A1 | 9/2014 | Karunakaran et al. | |
| 2014/0307980 A1 | 10/2014 | Hilt | |

OTHER PUBLICATIONS

M. Matheny, Pinterest Tips—A Tutorial Guide for Beginners, The Yummy Life, http://www.theyummylife.com/Pinterest_tips.

Magestore, (Jul. 2, 2012) How to Add a "Pin it" button (Pinterest) to product page? Retrieved May 31, 2017 http://blog.magestore.com.how-to-add-a-pin-it-button-to-product-page/.

Pinterest Website, Getting Started and Goodies, Retrieved May 31, 2017 http://web.archive.org/web/20120504012224/http://pinterest.com/about/goodies/ and http://web.archive.org/web/20120504032342/http://pinterest.com/about/help.

* cited by examiner

PICKS API WHICH FACILITATES DYNAMICALLY INJECTING CONTENT ONTO A WEB PAGE FOR SEARCH ENGINES

CROSS REFERENCE TO RELATED APPLICATIONS

U.S. patent application Ser. No. 13/891,649, entitled "On-Site Curation That Enables Scalable Peer Generated Content that is Visual and Inspires Discovery Anywhere" by inventors Christopher H. Howe, Joseph D. Langeway, Manish C. Mehta, and Rodney T. Whisnant, filed on May 10, 2013, describes exemplary methods and systems and is incorporated by reference in its entirety.

U.S. patent application Ser. No. 13/891,666, entitled "Automated Creation of Collages from a Collection of Assets" by inventors Rodney T. Whisnant, Joseph D. Langeway, and Christopher H. Howe, filed on May 10, 2013, describes exemplary methods and systems and is incorporated by reference in its entirety.

U.S. patent application Ser. No. 13/891,684, entitled "Process To Display Picks On Product Category Pages" by inventors Rodney T. Whisnant, Joseph D. Langeway, and Christopher H. Howe, filed on May 10, 2013, describes exemplary methods and systems and is incorporated by reference in its entirety.

U.S. patent application Ser. No. 13/891,698, entitled "Forward Looking Recommendations Using Information Derived from a Plurality of Picks Generated by a Plurality of Users" by inventor Rodney T. Whisnant, filed on May 10, 2013, describes exemplary methods and systems and is incorporated by reference in its entirety.

U.S. patent application Ser. No. 13/891,721, entitled "Mobile Application Enabling Product Discovery and Obtaining Feedback from Network" by inventors Henry Haitian Chen and Manish C. Mehta, filed on May 10, 2013, describes exemplary methods and systems and is incorporated by reference in its entirety.

BACKGROUND OF THE INVENTION

Field of the Invention

The present invention relates to the management of information handling systems. More specifically, embodiments of the invention provide a system and method for automating the provision of social media product recommendations in an electronic commerce environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have played a key role in the rapid growth of electronic commerce on the Internet. In recent years, information handling systems have also been instrumental in the widespread adoption of social media into the mainstream of everyday life. Social media commonly refers to the use of web-based technologies for the creation and exchange of user-generated content for social interaction. As such, it currently accounts for approximately 22% of all time spent on the Internet.

One emerging aspect of electronic commerce is for users to use social media sites as a venue to review or recommend various products. Such reviews or recommendations may be provided in a variety of ways, including simple online forum or social media posts, to blog entries, video clips, and even dedicated websites. In some cases, the reviewer may provide a link to either a merchant's website, or a product details page, for the product they are reviewing or recommending. In other cases, a merchant may provide a link on their product details page to a reviewer or recommender.

However, such approaches typically require the viewer of the product reviews or recommendations to leave the social media site to visit the merchant's website or product details pages. Conversely, viewers of a merchant's product details pages may be required to leave to the merchant's website to view the reviews or recommendations of the product they were considering. Furthermore, the reviewer or recommender of the products is typically not provided the means to provide their reviews or recommendations on a merchant's product pages that are returned to a search engine in response to a search query.

SUMMARY OF THE INVENTION

A system and method are disclosed automating the provision of social media product recommendations in an electronic commerce environment. In various embodiments, Pick List search engine optimization (SEO) operations are initiated in response to a search engine submitting a request for product-related content, such as a product page, to a merchant web server. In turn, the merchant web server submits a server-side request through an SEO services interface to one or more SEO APIs for processing.

In response, the one or more SEO APIs returns Picks markup content that is associated with the requested product-related content. The merchant web server then combines the requested product-related content, such as product page markup content, with the returned Picks markup content to generate a product page. The product page, which includes the dynamically injected Picks markup content, is then returned to the search engine where it is indexed.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method are disclosed for automating the provision of social media product recommendations in an electronic commerce environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
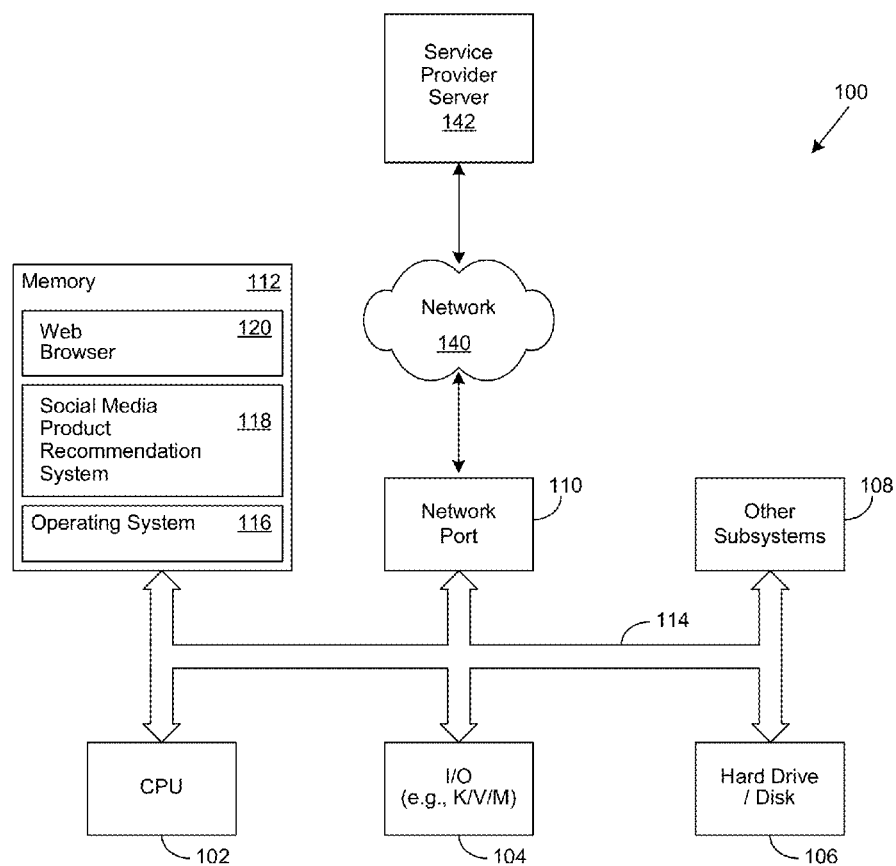
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a social media recommendation system 118 and a web browser 120. In one embodiment, the information handling system 100 is able to download the social media recommendation system 118 from the service provider server 142. In another embodiment, the social media recommendation system 118 is provided as a service from the service provider server 142.

Figure 2:
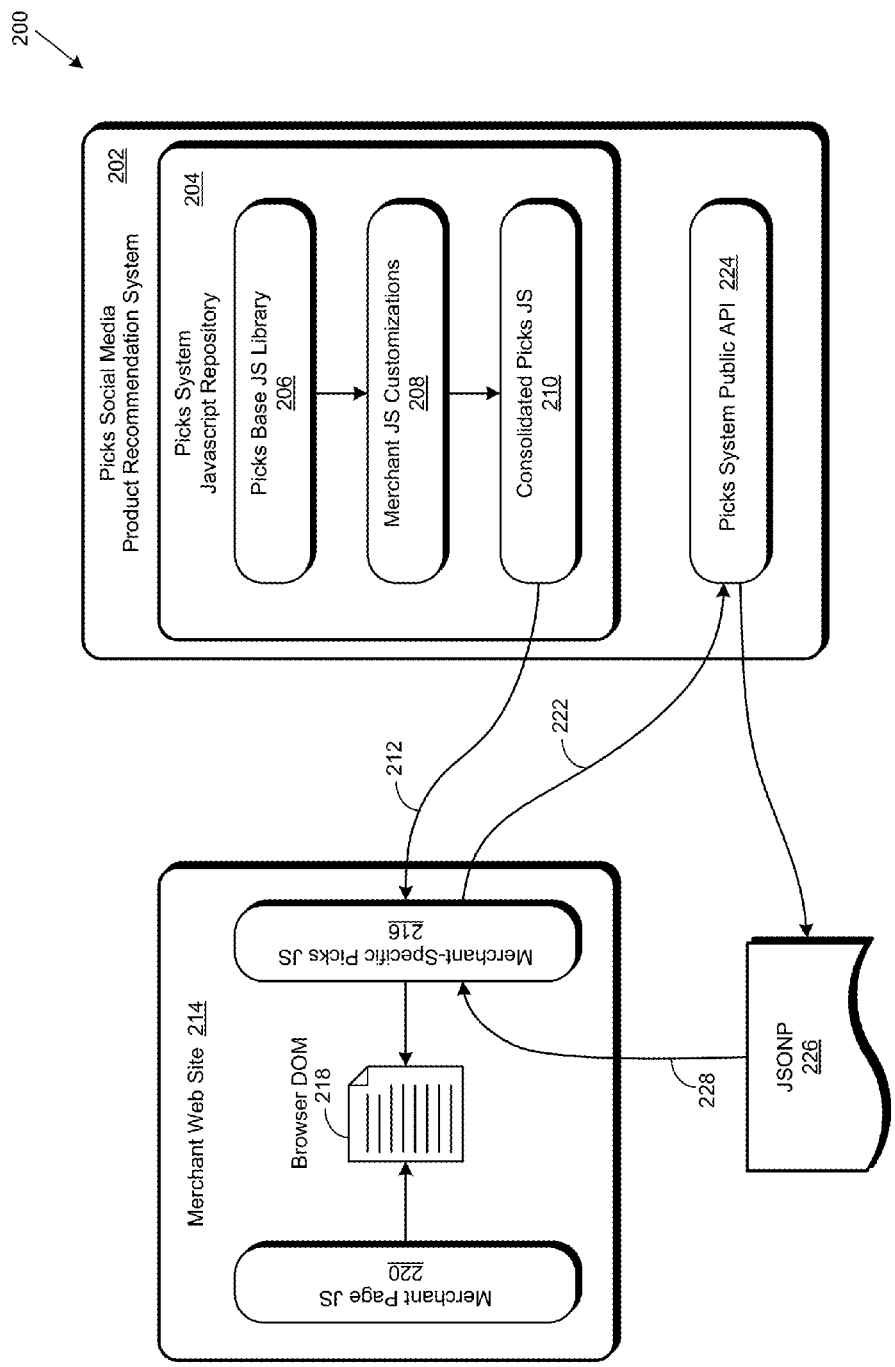
FIG. 2 is a simplified block diagram showing the implementation of a social media product recommendation system in an electronic commerce environment.

FIG. 2 is a simplified block diagram showing a social media product recommendation system 202 implemented in accordance with an embodiment of the invention in an electronic commerce environment 200. In various embodiments, the social media product recommendation system 202, referred to herein as a "Pick System," is implemented to allow users to create and manage collections of their favorite products. These product collections, variously referred to herein as a "Pick List," a "Pick Collage," or "Picks," can then be automatically published and displayed on related product details pages 214 in a merchant's website. In various embodiments, the Pick List, Pick Collage, or Picks are provided to the merchant's website from a server at a remote location. In certain embodiments, the Pick List, Pick Collage, or Picks are provided to the merchant's website by a service provider on an on-demand basis.

In various embodiments, visitors to these product details pages 214 can shop directly from a Pick List, share a Pick List through social media networks, or build a long-term social connection with the creator of a Pick List by "following" them. In certain of these embodiments, the visitors are likewise able to use such social media networks to "like" predetermined Pick Lists, Pick Collages, or Picks. As used herein, in the context of social media environments, the term "like" refers to the user expressing that he or she likes, enjoys or supports certain content.

As used herein, a Pick List refers to a pictorial grouping of products that a user has selected, assembled and named. In various embodiments, the data associated with a Pick List is managed by the Pick System 202 as described in greater detail herein. As used herein, a Pick Collage refers to a set of products that a user has selected from one or more Pick Lists, which are then pictorially arranged by the user for use as a background image within a user interface window of a display device. In certain embodiments, a Pick Collage may include a product that is not a member of a Pick List associated with the Pick System user.

In various embodiments, one or more Pick Collages are implemented to allow Pick System users to choose a different visual layout for products in existing Pick Lists. In certain embodiments, various Pick Collage templates are provided, which offer different backgrounds and positioning to give the Pick Collage creator control over which products are displayed in which positions. In various embodiments, a Pick System user is able to select from a plurality of Pick Collage templates, each of which includes various design parameters, such as a visual layout, a background image, a color palette, and a typeface.

In certain embodiments, Pick Collages are displayed on a merchant's website product details pages, the Pick Collage creator's Picks user profile, or both. In various embodiments, a predetermined Pick List displays the products in a simple layout while a Pick Collage displays the same products in a more creative rendering. As such, Pick Collages allow Pick Collage creators to select products from one or more of their existing Pick Lists, select an existing Pick Collage design template, and then populate the selected Pick Collage design template with the selected products.

As used herein, a "Pick Set" refers to a grouping of two or more Pick Lists. As used herein, a "Pick List preview" refers to the display of a predetermined number of products that were most recently added to one or more target Pick Lists. In one embodiment the predetermined number of products is determined by the Pick System user. In another embodiment, the predetermined number of products is determined by an administrator of the merchant's website. In yet another embodiment, the predetermined number or products is different for various pages within the merchant's website. In still another embodiment, the one or more target Pick Lists are selected by the Pick System user. In one embodiment, the one or more target Pick Lists are a predetermined number of Pick Lists that a Pick System user has most recently interacted with.

As used herein, a "Picks Collage detail page" refers to the display of product details contained in a selected Pick Collage. In various embodiments, the Picks Collage detail page provides predetermined functionalities. As used herein, an "anonymous user" refers to a user who either does not have a client login identifier or a user that has a client login identifier but is not presently logged-in to the Pick System.

In various embodiments, the Pick System 202 is implemented to reduce the effort required for a merchant to integrate the functionality of the Pick System 202 within their website. In various embodiments, software customization tasks are performed either by an operator of the Pick System 202 or a third party integration team. Another aspect is that these third parties are able to maintain and enhance the feature set provided to the merchant without requiring the merchant to perform any additional integration or software upgrade tasks once the basic integration has been established.

In various embodiments, these objectives are achieved, in part, by integrating Pick System functionality into the merchant's website by including a merchant-specific script code file, such as a Picks Javascript (JS) file 216 in predetermined pages, such as product details pages, of the merchant's website 214. In various embodiments, the merchant-specific Picks JS file 216 is dynamically assembled. As a result, the merchant-specific Picks JS file 216 has the ability to change, capture data, and inject information into the merchant's website in various ways. This dynamic JS approach, coupled with content injection into a web page, is implemented in various embodiments as a "broadcast" paradigm depicted in FIG. 2.

In various embodiments, a consolidated script code file, such as the consolidated Picks JS file 210 included in a merchant's web page is dynamically assembled at runtime by combining a general script code base library, such as the general Pick System base JS library 206, with a series of script code customizations, such as JS customizations 208, that are generated to support merchant-specific aspects of the integration. In various embodiments, the Pick System base JS library 206, the merchant JS customizations 208, and the consolidated Picks JS file 210 are stored and maintained in a Pick System JS repository 204. In various embodiments, the resulting consolidated Picks JS file 210 is implemented and maintained 212 as a merchant-specific Picks JS file 216 in the merchant's website 214. In various embodiments, the consolidated Picks JS file 210 is implemented and maintained 212 as a merchant-specific Picks JS file 216 either by the owner or an operator of the merchant's website 214, the operator of the Pick System 202, or a third party.

In various embodiments, the merchant-specific Picks JS file 216 is implemented to make dynamic HTTP requests 222 to the Pick System 202 to record or retrieve additional information through a Pick System Public Application Programming Interface (API) 224. In certain of these embodiments, the Pick System 202 provides a response 228 to the requests with predetermined data. In at least one embodiment, JS Object Notation with Padding (JSONP) 226 is used to perform the response. In one embodiment, this data is used in a target page of the merchant's website 214. In another embodiment, the data is used to trigger additional types of requests back to the Pick System 202. In various embodiments, the data is formatted and dynamically into the target page of the merchant's website 214 as it is received from the Pick System 202 by manipulating the browser's Document Object Model (DOM) 218. In one embodiment, changes to the merchant page JS 220 are kept in sync with the merchant JS customizations 208.

Figure 3A:
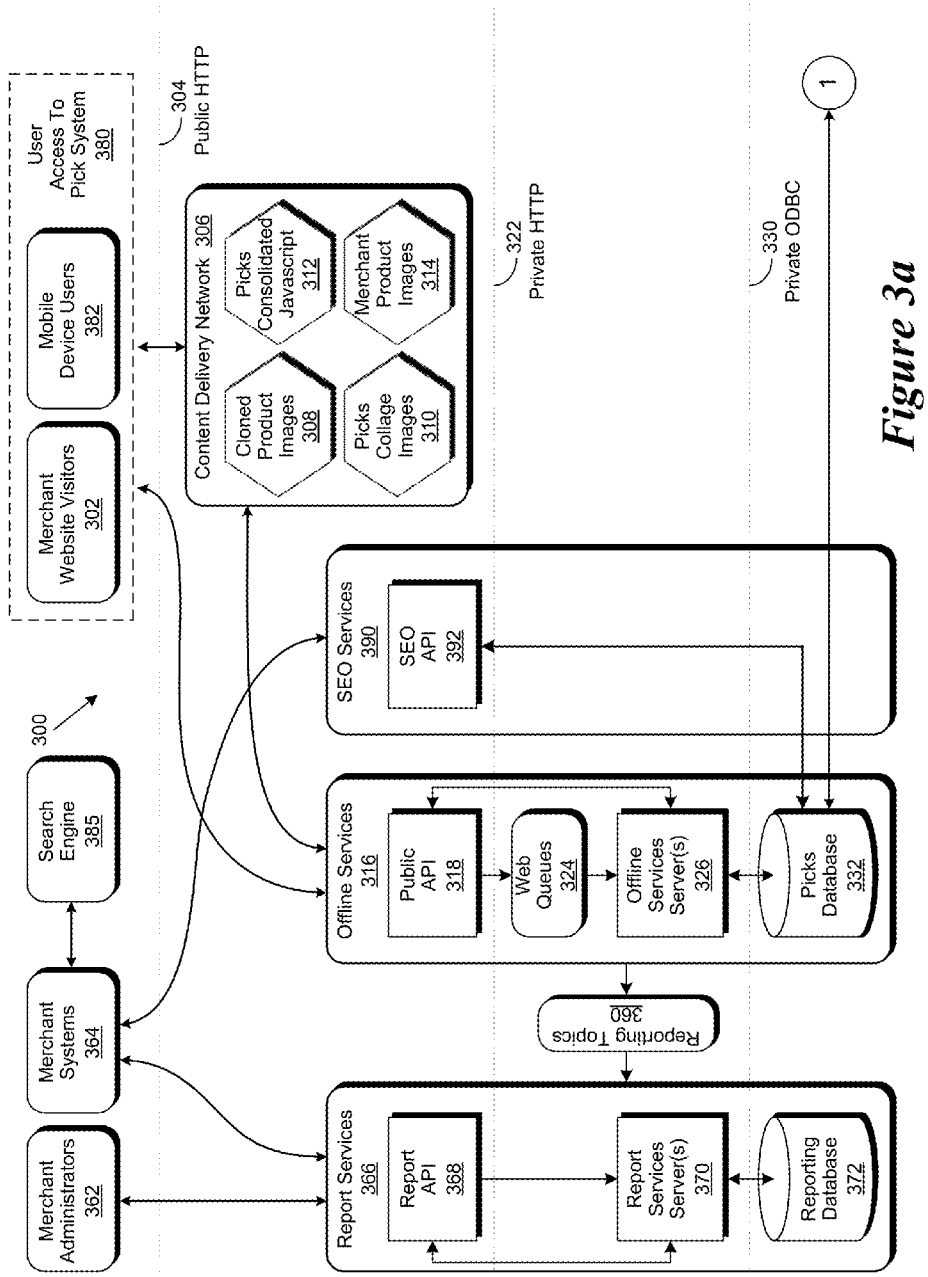
FIGS. 3a and 3b are a simplified block diagram showing a high-level architecture of a social media product recommendation system.
Figure 3B:
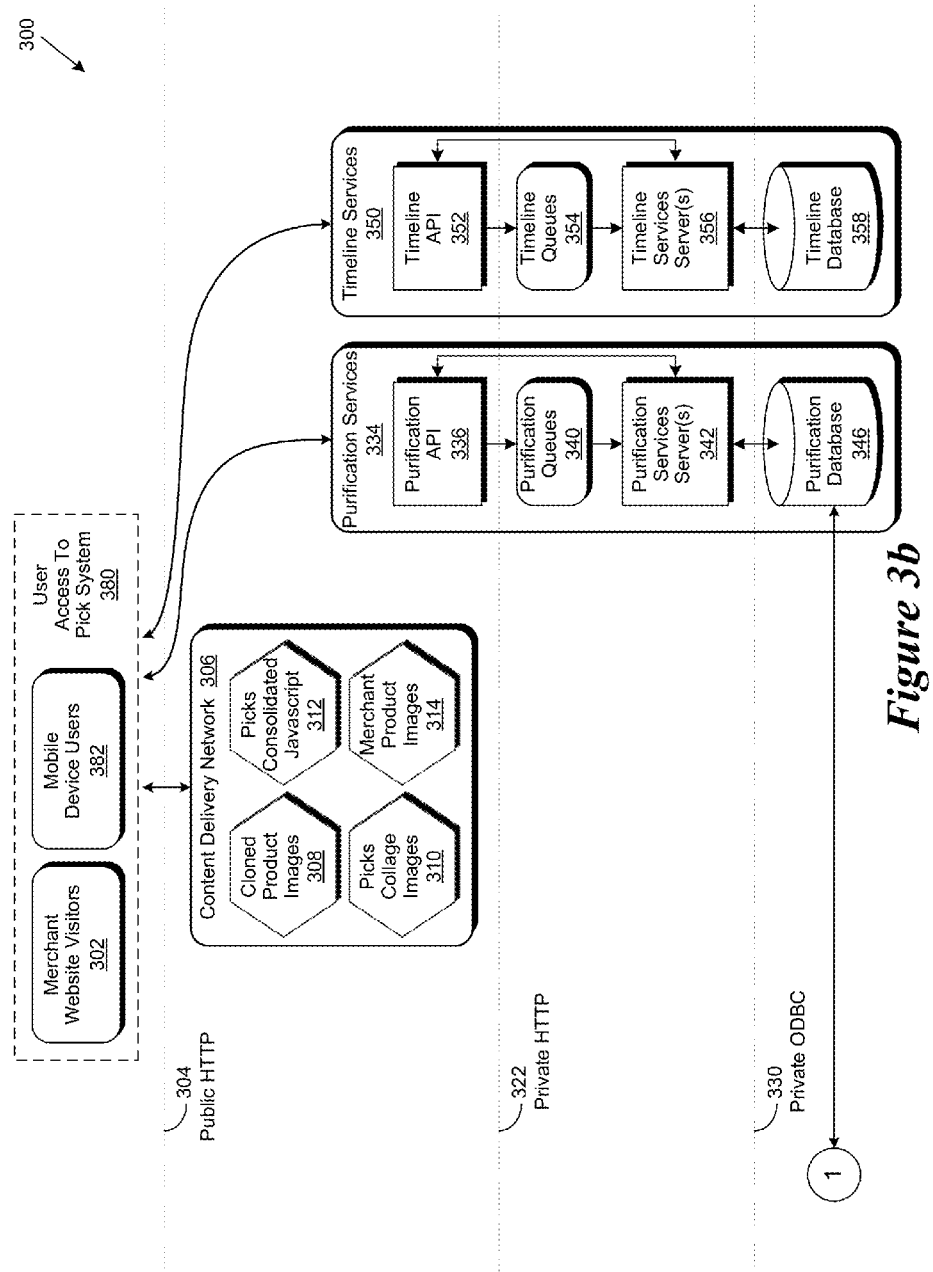

FIGS. 3a and 3b are a simplified block diagram showing a high-level architecture of a social media product recommendation system 300 implemented in accordance with an embodiment of the invention. In various embodiments, the social media product recommendation system 300, referred to herein as a "Pick System," is implemented in a cloud computing environment familiar to skilled practitioners of the art. In this embodiment, the Pick System 300 includes a content delivery network (CDN) 306, an offline services system 316, a purification services system 334, a timeline services system 350, a search engine optimization (SEO) services system 390, and a report services system 366. As shown in FIG. 3, user access to the Pick System 380 includes visitors to a merchant's website 302 and mobile device users 382.

In various embodiments, a mobile Pick System application is implemented on a mobile device associated with a Pick System user. In these embodiments, certain predetermined Pick System operations are performed by the Pick System user's mobile device as described in greater detail herein. In one embodiment, the mobile Pick System application is specific to a predetermined merchant that has implemented the Pick System, such as the merchant associated with the physical site. In another embodiment, the mobile Pick System application is configured to be specific to a predetermined set of merchants that have implemented the Pick System. In yet another embodiment, the mobile Pick System application is configured to support Pick System operations with any merchant that has implemented the Pick System 300.

As used herein a mobile device refers to a mobile device refers to wireless devices such as mobile telephones, smart phones, personal digital assistants (PDAs), tablet computers, handheld or laptop computers, and similar devices that have telecommunications capabilities. In various embodiments, the mobile device is used to exchange information between the Pick System 300 and a Pick System user through the use of a network. In various embodiments, the network may be a public network, such as the Internet, a physical private network, a virtual private network (VPN), or any combination thereof. The combination of the mobile device and the network may be considered a mobile environment.

In certain embodiments, the network may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA). Other embodiments may include the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

In various embodiments, the visitors to a merchant's website 302 and the mobile device users 382 are also able to access the CDN 306, the offline services system 316, the purification services system 334, and the timeline services system 350 through a public Hypertext Transfer Protocol (HTTP) 304 environment, such as the public Internet. As also shown in FIG. 3, the merchant's website administrators 362, and associated merchant systems 364, are likewise able to access the report services system 366 through the public HTTP environment 304.

In various embodiments, the offline services system 316, the purification services system 334, the timeline services system 350, and report services system 366 respectively include a public Application Program Interface (API) 318, a purification API 336, a timeline API 352, and a report API 368. In various embodiments, the public API 318, the purification API 336, and the timeline API 352 manage HTTP requests originating from browsers used by visitors to a merchant's website 302 that has implemented merchant-specific Picks Javascript (JS) files that are described in greater detail herein. In various embodiments, the public API 318 also manages HTTP requests from the content delivery network 306. In various embodiments, the report API 352 manages HTTP requests from the merchant's website administrators 362 and associated merchant systems 364.

In various embodiments, the content served by the Pick System 300 to the public HTTP environment is the same, or changes infrequently, regardless of which user is accessing the content. In certain of these embodiments, this content is cached in, and served from, a CDN 306, such as the CloudFront® CDN 306 provided by Amazon® Web Services (AWS) to reduce delivery latency. In various embodiments, the CDN 306 includes cloned product images 308, Pick Collage images 310, consolidated Picks JS 312, and merchant product images 314. As used herein, a cloned product image 308 refers to a duplicated client product image 314. In one embodiment, a merchant product image 314 is resized to generate a cloned product image 302.

In one embodiment, a request is received for a cloned product image 308, a Pick Collage image 310, consolidated Picks JS 312, or a merchant product image 314 that is not currently present in the CDN 306. In this embodiment, the CDN 306 submits a request to the public API 318 to dynamically build and retrieve the requested content. In one embodiment, a request is received for a merchant product image 314. In this embodiment, the public API 318 will in turn submit a request to the merchant's website to retrieve the image and then save it in the CDN 306 for subsequent use.

In various embodiments, the purification services system 334 is implemented to perform purification services on content submitted by Pick System users to ensure that inappropriate content (e.g., profanity, derogatory comments, etc.) is not presented in the merchant's website. As shown in FIG. 3, the purification services system 334 includes a purification API 336, which submits requests for purification services to one or more purification queues 340, which in turn manage submission of the purification service requests to one or more purification services servers 342. The one or more purification services servers 356 then use purification data stored in the purification database 346 to perform purification services on content stored in the Picks database 332.

As likewise shown in FIG. 3, the timeline services system 350 includes a timeline API 352, which submits requests for timeline information to one or more time queues 354, which in turn manage submission of the timeline information requests to one or more timeline services servers 356. The one or more timeline services servers 356 then process timeline data stored in the timeline database 358 to generate a timeline information response, which in turn is provided to the timeline API 352.

In various embodiments, the timeline services system 350 is implemented physically and logically separate from other components of the Pick System 300 to offset the computationally intensive effects of generating and providing timeline information. In certain of these embodiments, timeline services are exposed in a traditional HTTP manner, similar to the public API 318. However, the timeline services are not accessed through the public HTTP environment 304 in these embodiments. Instead, when a timeline information request is received by the public API 318, it makes a private HTTP request 322 to the timeline services system 350 to either request or record timeline information.

In various embodiments, the offline services system 316 is implemented to perform Pick System 300 processes associated with services that do not need to be provided in real-time. In certain of these embodiments, the Pick System 300 services are provided asynchronously. Examples of such processes include the calculation of timeline data or aggregation of reporting statistics.

As shown in FIG. 3, the offline services system 316 includes a public API 318, which submits requests for offline services to one or more web queues 324, which in turn manage submission of the offline service requests to one or more offline services servers 326. The one or more offline services servers 326 then processes various data elements stored in the Picks database 332 to generate an offline services response, which in turn is provided to the public API 318.

In various embodiments, a search engine 385 submits a request for product-related content to a merchant system 364, such as a merchant web server 1264. In turn, the merchant system 364 submits a server-side request to the SEO services system 390, where it is then routed to the SEO API 392 for processing. In response, the SEO API returns Picks markup content that is associated with the requested product-related content. In certain embodiments, the Picks markup content is stored in the Picks database 332. In one embodiment the Picks markup content includes Hypertext Markup Language (HTML) content. The merchant system 364 then combines the requested product-related content with the returned Picks markup content to generate a product page, which is then returned in a search response message to the search engine 385. The search engine 385 then indexes the combined page markup content and Picks markup content.

In various embodiments, a report services system 366 is implemented to allow merchant administrators 362 and merchant systems 364 to access various information related to data that the Pick System 300 collects. Examples of such data include the top Pick Lists associated with the merchant's website, most popular products, most-liked users, etc. As shown in FIG. 3, the report services system 366 includes a report API 368, which submits requests for report services to one or more report services servers 370. The one or more report services servers 370 then processes various data elements stored in the reporting database 372 to generate a report services response, which in turn is provided to the report API 368.

In certain embodiment, the report API 368 provides merchant website administrators 362 a public HTTP 304 interface, which can be used with their browsers to browse information stored in the reporting database 372. In another embodiment, the report API 368 provides merchant systems 364, such as business intelligence systems or data warehouses, a public HTTP 304 interface to dynamically submit report services requests to the report services servers 370. In various embodiments, the offline services system 316 provides various Pick System 300 data in the form of reporting topics 360 via a private HTTP interface to the report services system 366.

In various embodiments, Pick System 300 data, with the exception of merchant product images 314, is stored in the Picks database 332, the timeline database 358, and the reporting database 372, which are implemented in a private Open Database Connectivity (ODBC) environment 330. In certain embodiments, the Picks database 332 includes merchant configuration details, registered user records, Pick Lists, and Pick Collages. In various embodiments, server-based scraping is implemented to mitigate potential issues with inappropriate content being injected into the Pick System 300, and by extension, the Picks database 332, by malicious users.

In various embodiments, a database sharding approach is implemented for large data sets stored in the Picks database 332. As used herein, a database shard is a horizontal partition in a database or search engine. Each individual partition is referred to as a shard or database shard. Horizontal partitioning is a database design principle whereby rows of a database table are held separately, rather than being split into columns. Each partition forms part of a shard, which may in turn be located on a separate database server or physical location. In at least one embodiment, the Picks Database 332 is implemented using a NoSQL database.

Figure 4:
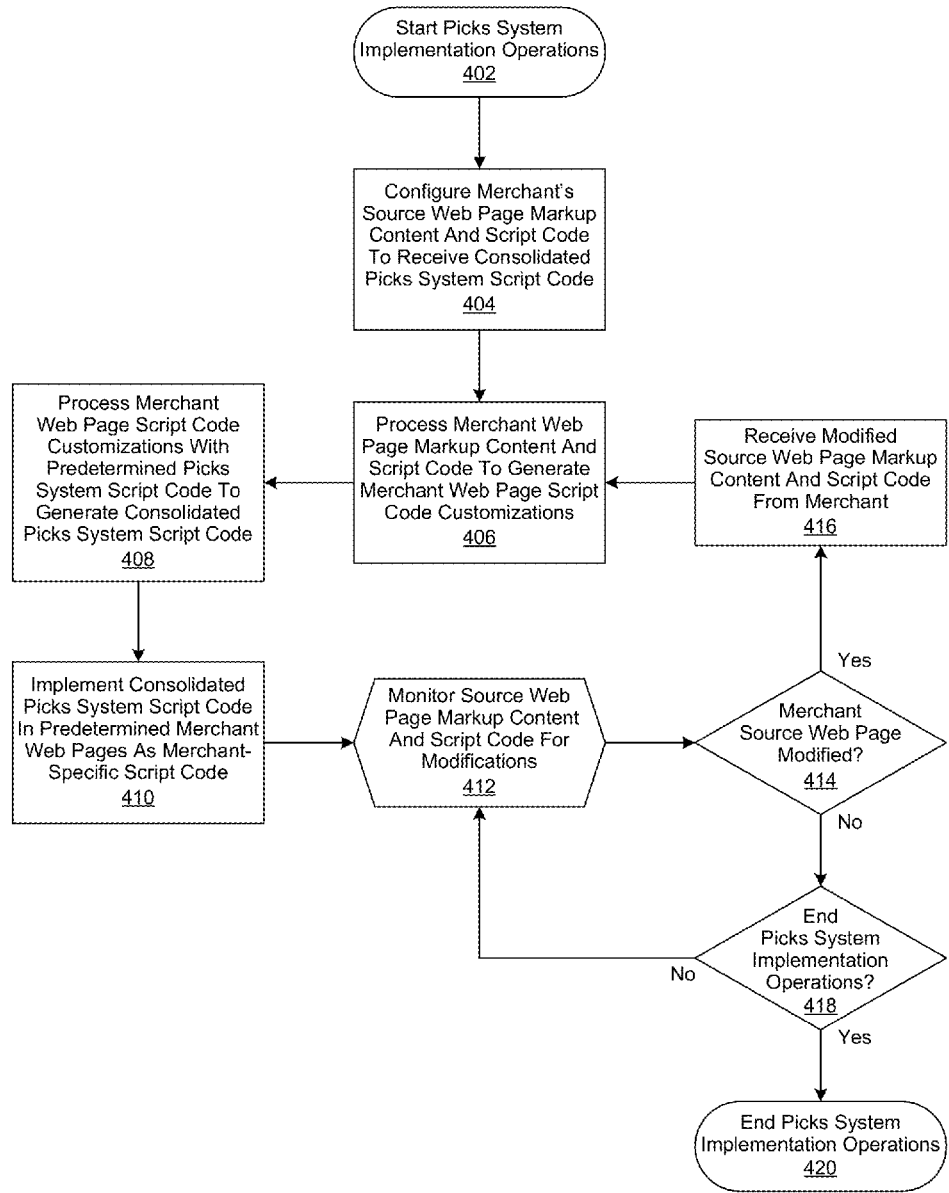
FIG. 4 is a generalized flowchart of the implementation of a social media product recommendation system in an electronic commerce environment.

FIG. 4 is a generalized flowchart of the implementation of a social media product recommendation system in accordance with an embodiment of the invention in an electronic commerce environment. In this embodiment, operations to implement a social media product recommendation system, herein referred to as a "Pick System," are begun in step 402, followed by configuring a merchant's source web page markup content and script code to receive consolidated Pick System script code in step 404. In various embodiments, the source web page markup content includes Hypertext Markup Language (HTML) content. In various embodiments, the source script code includes Javascript (JS) code.

Then, in step 406, the merchant's source web page markup content and script code are processed to generate merchant web page script code customizations. The resulting merchant web page script code customizations are then processed in step 408 with predetermined Pick System script code to generate consolidated Pick System script code. The resulting consolidated Pick System script code is then implemented in predetermined merchant web pages as merchant-specific script code in step 410.

The merchant's source web page markup content and script code is then monitored in step 412 for the occurrence of modifications, followed by a determination being made in step 414 whether any modifications have occurred. If so, then the modified web page markup content and script code is received from the merchant's web site in step 416 and the process is continued, proceeding with step 406. Otherwise, a determination is made in step 418 whether to end Pick System implementation operations. If not, then the process is continued, proceeding with step 412. Otherwise, Pick System implementation operations are ended in step 420.

Figure 5A:
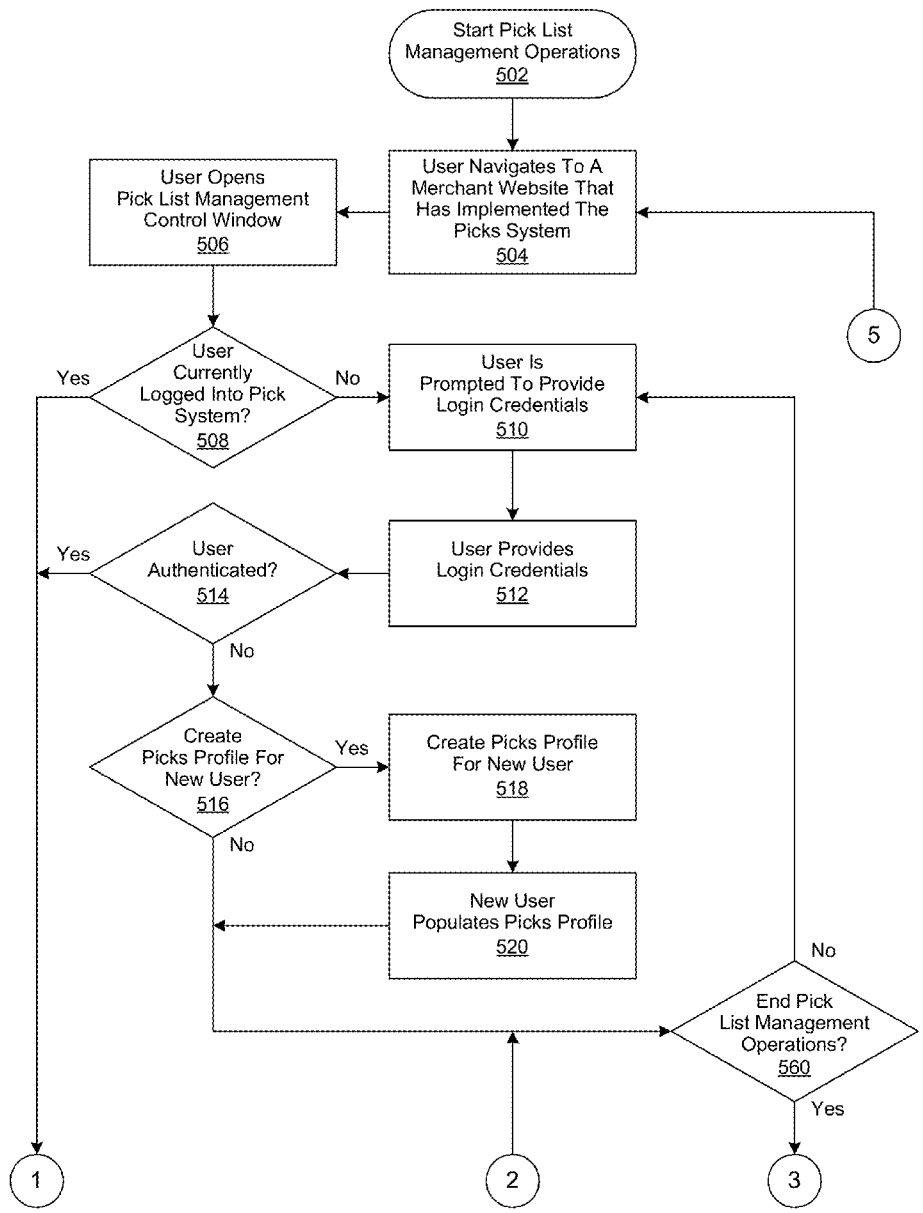
FIGS. 5a through 5c are a generalized flowchart of the performance of Pick List management operations in an electronic commerce environment.
Figure 5B:
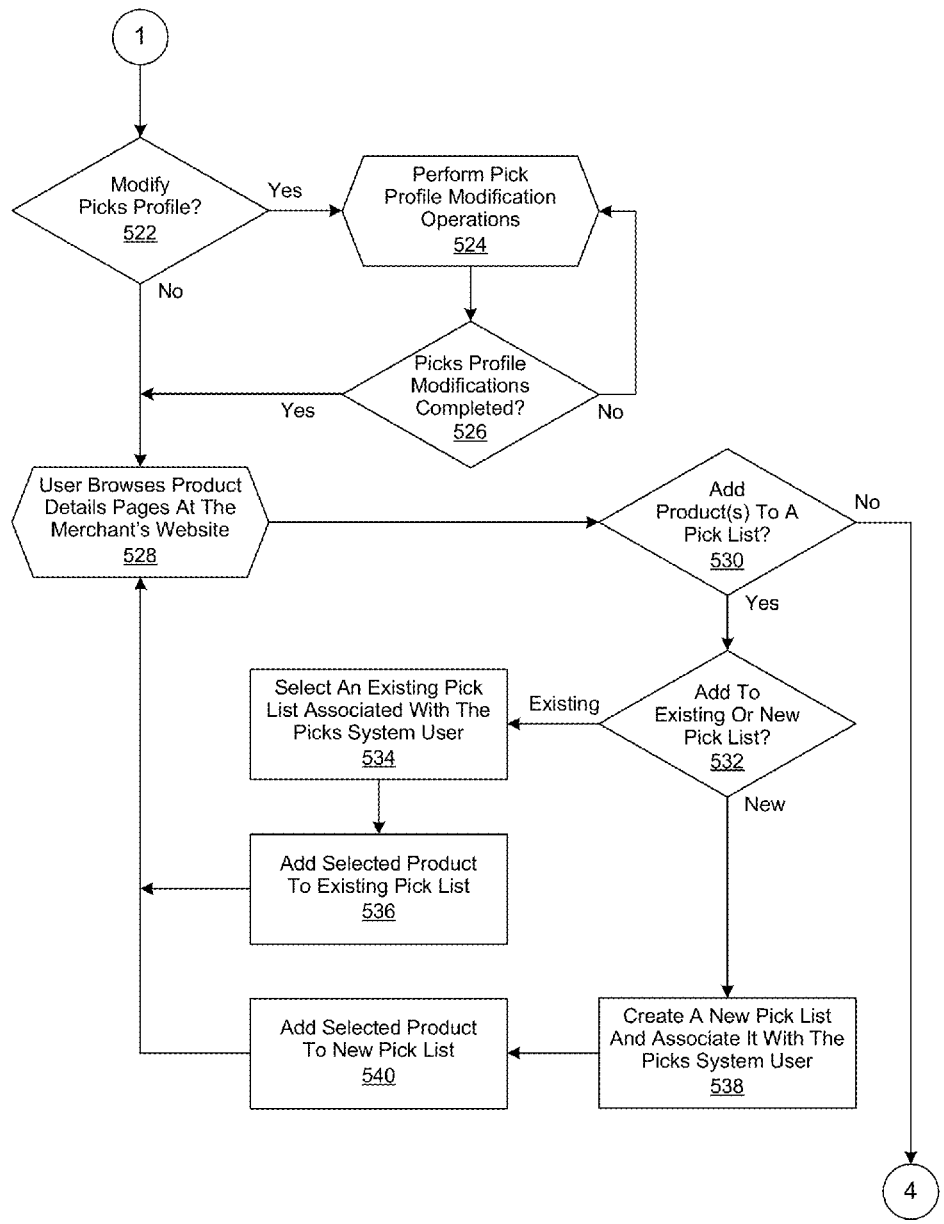
Figure 5C:
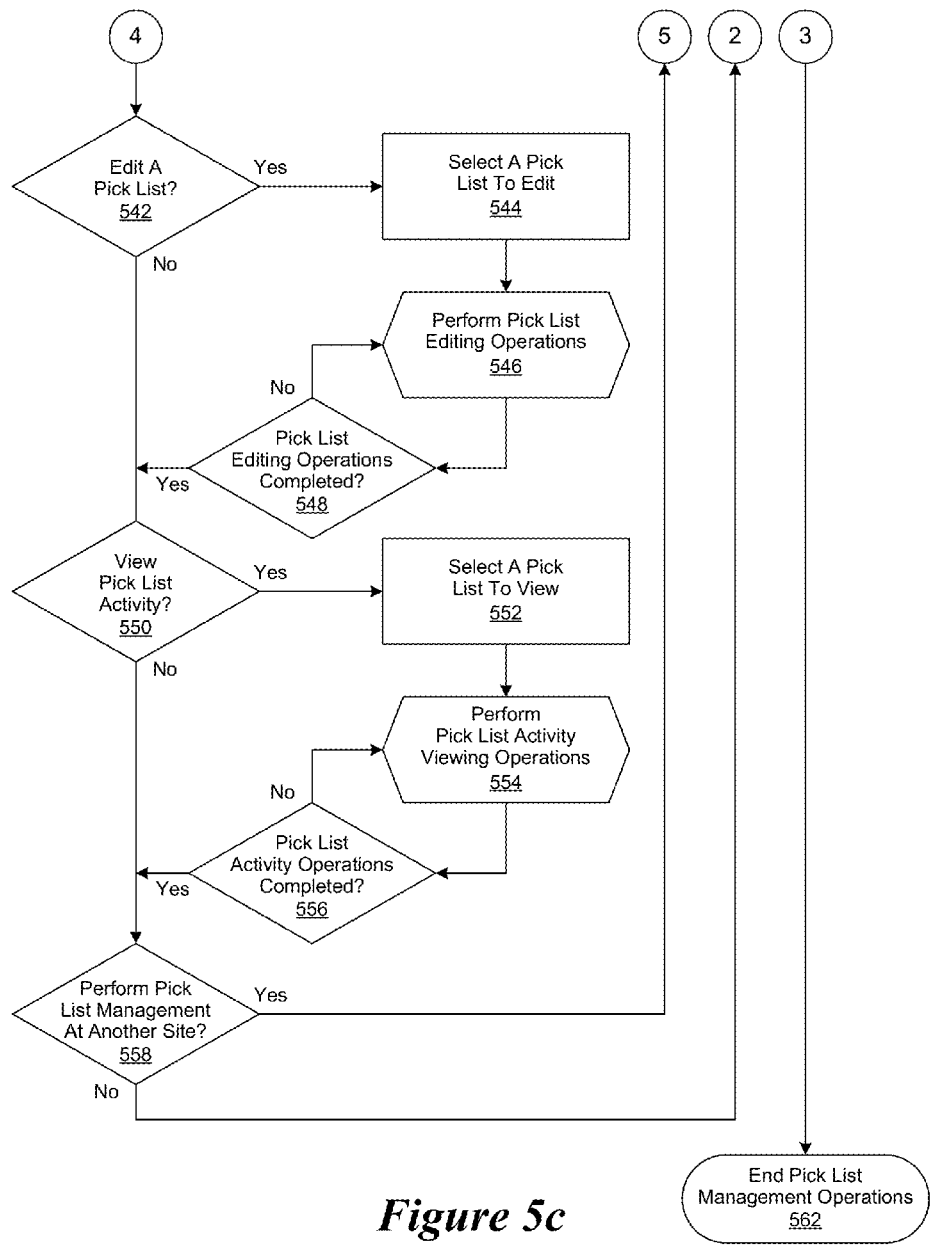

FIGS. 5a through 5c are a generalized flowchart of Pick List management operations performed in accordance with an embodiment of the invention in an electronic commerce environment. In this embodiment, Pick List management operations are begun in step 502, followed by a user navigating in step 504 to a merchant's web site that has implemented the Pick System. Then, in step 506, the user opens a Pick List management control window.

A determination is then made in step 508 whether the user is currently logged into the Pick System. In one embodiment, the user logs into the Pick System at each merchant's website. In another embodiment, Pick System is implemented to support universal login. In this embodiment, the user initially logs into the Pick System at a first merchant's website. Thereafter, they are automatically logged into the Pick System at other merchant's websites.

If it was determined in step 508 that the user not logged into the Pick System, then the user is prompted in step 510 to provide login credentials, which are then provided in step 512. A determination is then made in step 514 whether the user has been authenticated by the provided login credentials. If not, a determination is made in step 516 whether to create a Picks user profile for the user. If so, then a Picks user profile is created for the new user, who then populates the newly-created Picks user profile with associated user account information in step 520.

Once the new Pick System user populates their Picks user profile in step 520, or if it was determined in step 516 not to create a Picks user profile for a new user, a determination is made in step 560 whether to end Pick List management operations. If not, then the process is continued, proceeding with step 510. Otherwise, Pick List management operations are ended in step 562.

However, if it was determined in step 508 that the user was currently logged into the Pick System, or if it was determined in step 514 that the user was authenticated, then a determination is made in step 522 whether the user's Picks user profile is to be modified. If so, then Picks user profile modifications are performed in step 524. A determination is then made in step 526 whether modification operations to the user's Picks user profile have been completed. If not, then the process is continued, proceeding with step 524. Otherwise, or if it was determined in step 522 that the user's Picks user profile was not to be modified, then the user browses product details pages at the merchant's website in step 528.

A determination is then made in step 530 whether one or more products displayed on a product details page is to be added to a Pick List by the Pick System user. If so, then a determination is made in step 532 whether the one or more products is to be added to an existing or a new Pick List. If it is determined in step 532 that the one or more selected products is to be added to an existing Pick List associated with the Pick System user, then the existing Pick List is selected by the Pick System user in step 534. The one or more selected products are then added to the selected Pick List in step 536. However, if it is determined in step 532 to add the one or more selected products to a new Pick List, then a new Pick List is created and associated with the Pick System user in step 538. The one or more selected products are then added to the newly-created Pick List in step 540. Once the one or more selected products are respectively added to the existing or newly-created Pick Lists in steps 536 or 540, the process is continued, proceeding with step 528.

However, if it was determined in step 530 not to add one or more products to a Pick List, then a determination is made in step 542 whether to edit a Pick List. If so, then a Pick List is selected in step 544 to edit. Pick List editing operations are then performed on the selected Pick List in step 546. Once Pick List editing operations are performed in step 546, a determination is made in step 546 whether Pick List editing operations are completed. If not, then the process is continued, proceeding with step 543. Otherwise, or if it was determined in step 542 not to edit a Pick List, a determination is made in step 550 whether to view Pick List activity. If so, then a Pick List to view is selected in step 552, followed by the performance if Pick List activity viewing operations in step 554.

Once Pick List activity viewing operations have been performed in step 554, a determination is made in step 556 whether Picks List activity viewing operations have been completed. If not, then the process is continued, proceeding with step 554. Otherwise, or if it was determined in step 550 not to view Pick List activity, a determination is made in step 558 whether to continue Pick List management operations at another merchant's web site. If so, then the process is continued, proceeding with step 504. Otherwise, the process is continued, proceeding with step 560.

Figure 6A:
FIGS. 6a and 6b show the display of user's Picks user profile within a user interface (UI) window.
Figure 6B:
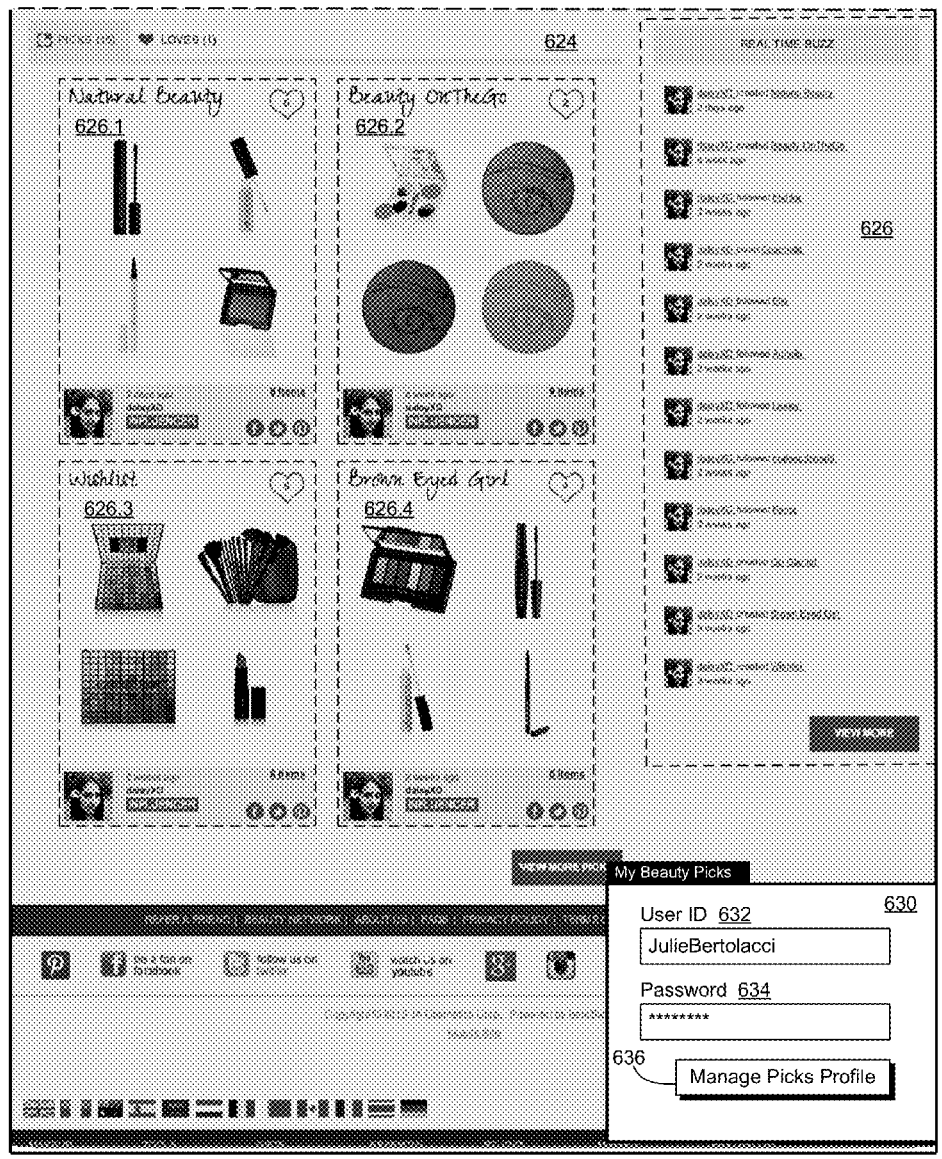

FIGS. 6a and 6b show the display of user's Picks user profile within a Picks user profile user interface (UI) window implemented in accordance with an embodiment of the invention. In various embodiments, a Pick System user navigates to a merchant's web site that has implemented the Pick System to manage their Picks user profile 604. As used herein, a Picks user profile 604 refers to the combination of Pick System user account information and associated Picks data. In various embodiments, the data in a Picks user profile 604 may include the Pick System user's login credentials 632, 634, their Pick System screen name 606 or Picks avatar 608, associated user information 610, Pick Lists 626.1, 626.2, 626.3, 626.4 and Pick Collages they have created, and their "likes" and "favorites" 612. As used herein, a "Pick System screen name" 606 refers to a user identifier associated with a user of the Pick System. In certain embodiments, the user is unable to create and manage their Pick Lists 626.1, 626.2, 626.3, 626.4 and Pick Collages until an associated Picks user profile 604 has been created.

If the user is not currently logged into the Pick System, then they submit their user credentials for authentication. In certain embodiments, a Picks fly-out UI window 630 is implemented for the submission of user credentials, such as a user identifier (ID) 632 and password 634. As used herein, a Picks fly-out UI window 630 refers to a fly-out window that resides on a merchant's web page, which can be opened and used by a Picks system user for various purposes. In various embodiments, these purposes include being authenticated by the Pick System and managing their associated Pick Lists, Pick Collages, or Picks user profile. In certain of these embodiments, the Picks fly-out UI window 630 is persistently made available to the user as they navigate various pages of the merchant's website. In various embodiments, the Pick System provides standalone user account management and authentication capabilities. In certain embodiments, Pick System user account management and authentication capabilities are integrated into the merchant's website's existing user account and authentication services.

In certain embodiments, the Pick System user can either log into an existing Picks account or create a new one. If the user decides to create a new Picks account, then an associated Picks user profile 604 is created, populated by the user, and then displayed within the Picks user profile UI window 602. Once the Pick System user is authenticated, they can then proceed to manage their Picks user profile by selecting a command button, such as the "Manage Picks user profile" command button 636, with a user gesture.

In various embodiments, the Picks user profile 604 provides the ability for the user to create a "persona" that may include items such as a Pick System screen name 606, a profile picture 608 or Picks avatar 608, a geographic location 610, interests 612, and a profile description 610. In certain embodiments, the Pick System user can edit this information by selecting an "Edit" command button 640 through a user gesture, such as a mouse-click with a cursor. In various embodiments, the provided "persona" information becomes the basis of the user's public Picks user profile 604 on the merchant's website.

In various embodiments, Pick Lists 626.1, 626.2, 626.3, 626.4 and Pick Collages are displayed within a Pick Lists sub-window 624. In these embodiments, the Pick Lists 626.1, 626.2, 626.3, 626.4 include a reference to the Pick System user that created them. In certain of these embodiments, a Pick List 626.1, 626.2, 626.3, 626.4 or Pick Collage can be "clicked-through" by viewers who desire additional information associated with their creator. In these embodiments, the creator's Picks user profile 604 is then displayed in the Picks user profile UI window 602. In various embodiments, the Picks user profile 604 contains personalized attributes about the Pick System user to further support the authenticity of the content they have created.

In various embodiments, a Pick System user is provided the ability to upload a Picks user profile image 808 that will be displayed with their Pick Lists 626.1, 626.2, 626.3, 626.4, Pick Collages and Picks user profile 604. In certain embodiments, a Pick System user is provided the ability to import an existing social media (e.g., Facebook®, Twitter®, etc.) profile image as their Picks user profile image 608. In various embodiments, a Pick System user is provided the ability to define a Picks user profile Screen Name 606 that is displayed with their Pick Lists 626.1, 626.2, 626.3, 626.4, Pick Collages, and Picks user profile 604. In certain embodiments, a Pick System user is provided the ability to select predetermined attributes 610, 612 that express their interests, define their location information, and write a brief description about themselves. In various embodiments, a Pick System user is provided the ability to select a predetermined image for their Picks user profile from a list of predefined backgrounds.

In various embodiments, the Pick System is implemented to provide Pick System users the ability to socially share their Picks user profile 604, or another user's Picks user profile to various social media environments 620, such as Facebook®, Twitter® or Pinterest®. For example, the other such users may be "followers" 616 of the Pick System user or users that the Pick System user is "following" 618. In certain embodiments, viewers of another user's Picks user profile have the ability to "follow" that user through the selection of a "Follow" control button 614 through a user gesture, such as a mouse-click. In various embodiments, each Pick System user's Picks user profile 604 displays who the "followers" 616 are of a Pick System user. In certain embodiments, the user's Picks user profile 604 displays who the Pick System user is "following" 618. In certain embodiments, the Pick System is implemented to allow a Pick System user to "click through" a listed follower 616 to access that the follower's associated Pick Lists, Pick Collages, and Picks user profile.

In various embodiments, the Pick System is implemented to provide an ongoing update of Pick List activities, herein referred to as a "Picks Activity Feed" 628, related to the Pick System user. In certain embodiments, the Picks Activity Feed 628 is provided in the form of a "Public View" within the Picks user profile UI window 602. In these embodiments, only predetermined Picks Activity Feed 628 information associated with a Pick System user is displayed to viewers of the user's Picks user profile 604. In one embodiment, the predetermined Picks Activity Feed 628 information only includes Pick List activities that the Pick System user has completed. In various embodiments, the Public View of the Picks Activity Feed 628 provides a list of the Pick Lists that the Pick System user has created. In certain embodiments, the Public View of the Picks Activity Feed 628 provides a list of the Pick Lists that the Pick System user has "liked." In certain embodiments, the Picks Activity Feed 628 is provided in the form of a "Private View." In these embodiments, the Picks Activity Feed information includes activities completed by the user as well as activities associated with other users' Pick Lists, Pick Collages, and Picks user profiles.

Figure 7A:
FIGS. 7a and 7b show a Pick List fly-out user interface window implemented to manage a plurality of Pick Lists.
Figure 7B:
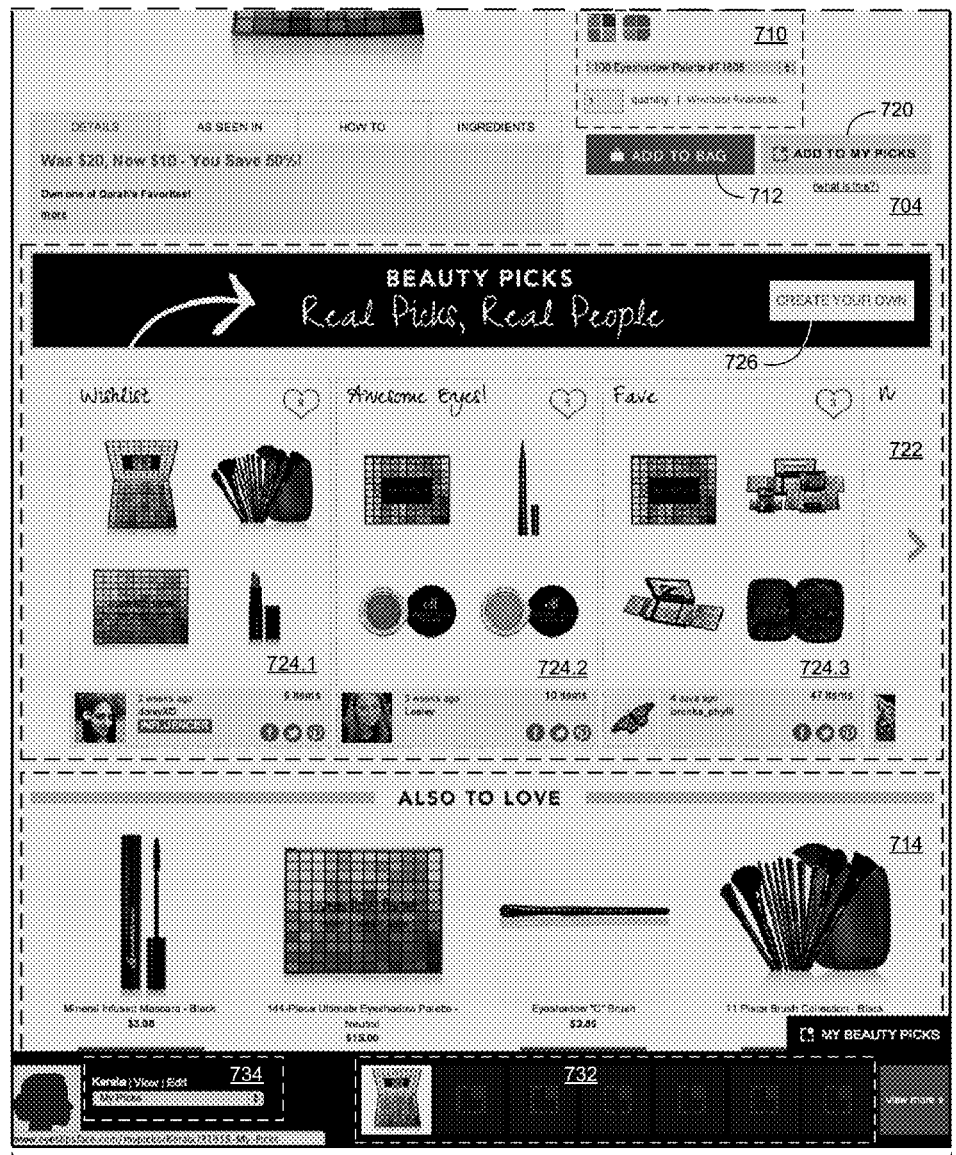

FIGS. 7*a* and 7*b* show a Pick List fly-out user interface window implemented in accordance with an embodiment of the invention to manage a plurality of Pick Lists. In various embodiments, Pick System functionality is implemented in a merchant's website. In certain of these embodiments, predetermined Pick System functionality is exposed to the user within a user interface (UI) window, such as a product details UI window 702 of the merchant's website. In this embodiment, the product details UI window 702 includes a featured product sub-window 704, which includes details associated with an individual featured product (e.g., product description, pricing, etc.), and a suggested products sub-window 714, which includes summary descriptions of a plurality of suggested products.

Referring to FIG. 7*a*, the featured product sub-window 704 also includes a "Write a Review" command button 706, which allows a Picks User to post a review of the featured product when selected through a user gesture, such as a mouse-click with a cursor. In certain embodiments, the featured product sub-window 704 includes a plurality of "Share with Friends" command buttons 708. In these embodiments, a Pick System user is provided the ability to socially share the featured product to a predetermined social media site (e.g., Facebook®, Twitter®, etc.) by selecting a corresponding "Share with Friends" command button 708 with a user gesture. In various embodiments, the featured product sub-window 704 includes a modal shopping sub-window 710, described in greater detail herein, which displays different options (e.g., quantity, colors, sizes, styles, etc.) that are available for the featured product.

In certain embodiments, the featured product sub-window 704 includes an "Add to Bag" command button 712. In these embodiments, the featured product is added to the user's shopping cart by selecting the "Add to Bag" command button 712 through a user gesture. In various embodiments, an "Add to My Picks" 720 control button is displayed to the Pick System user within the product details UI window 704. In certain embodiments, selection of the "Add to My Picks" 720 control button presents the Pick System user additional user controls, which allow the user to specify which Pick List the product should be added to. In various embodiments, a plurality of Pick Lists 724.1, 724.2, 724.3 associated with various Pick List users are displayed within a Pick Lists sub-window 722. In these embodiments, a Pick System user is able to create a new Pick List by selecting a "Create Your Own" command button 726.

In various embodiments, a Picks fly-out UI window 730 is implemented to provide the Pick System user the ability to perform Pick List editing operations on a predetermined Pick List. In certain embodiments, the Picks fly-out UI window 730 is implemented to display thumbnail images 732 of their existing Pick Lists. In these embodiments, a target thumbnail image 732 is selected by the Pick System user, who then uses controls 734 to view or edit the Pick List corresponding to the selected thumbnail image 732.

In certain embodiments, the Picks fly-out UI window 730 is implemented to provide the Pick System user the ability to delete individual products from the Pick List, rearrange the display order of products, rename, or delete the Pick List from the Pick System. In various embodiments, the Picks system automatically creates a Picks Detail Page that provides a list of products contained in the Pick List. In certain embodiments, the Pick System provides access to additional information and capabilities depending upon the context of the Pick System user viewing the Picks Detail Page. In various embodiments, the Picks fly-out UI window 730 is implemented to provide the Pick System user the ability to directly access the Picks Detail Page.

Figure 8A:
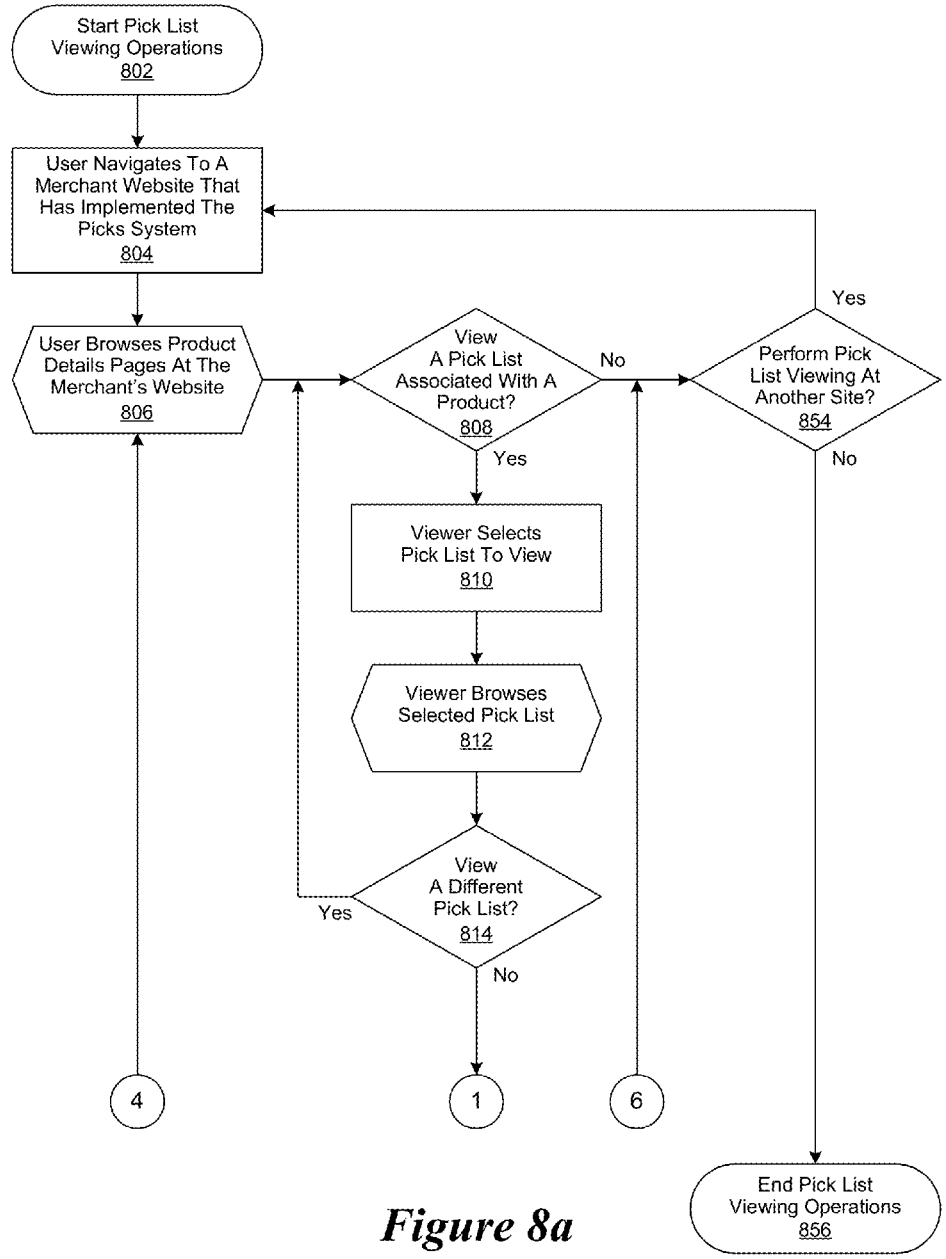
FIGS. 8a through 8c are a generalized flowchart of the performance of Pick List viewing operations in an electronic commerce environment.
Figure 8B:
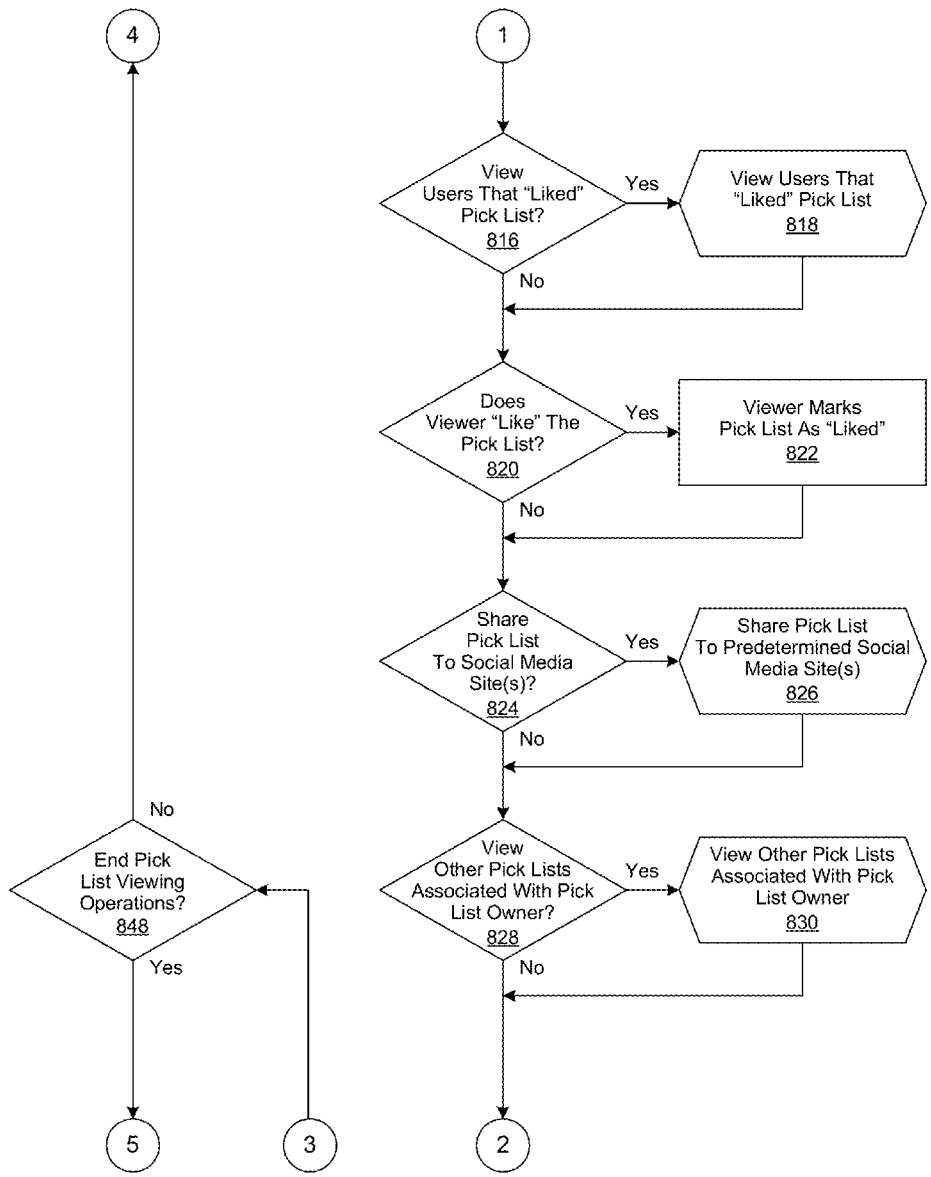
Figure 8C:
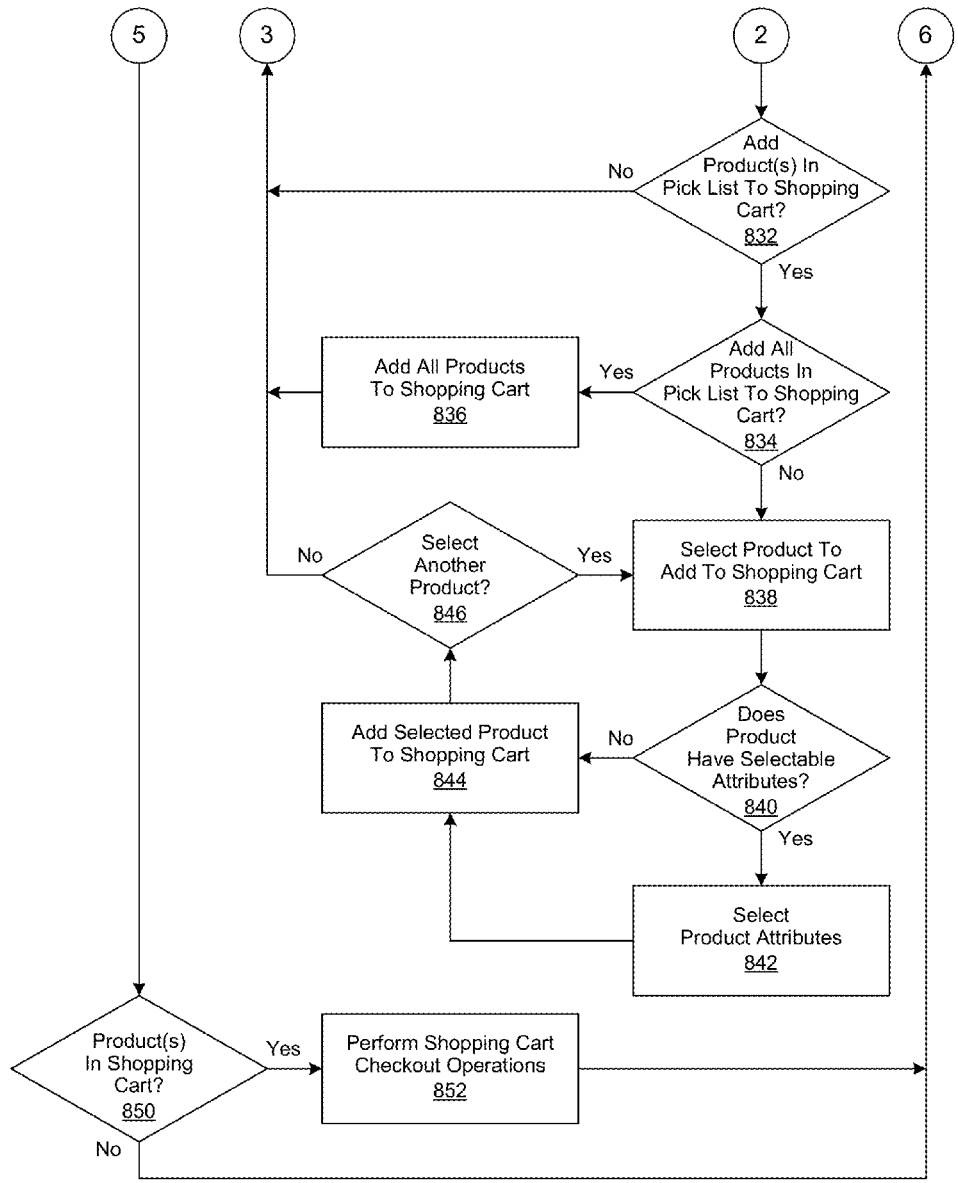

FIGS. 8*a* through 8*c* are a generalized flowchart of Pick List viewing operations performed in accordance with an embodiment of the invention in an electronic commerce environment. In this embodiment, Pick List viewing operations are begun in step 802, followed by a user navigating in step 804 to a merchant's web site that has implemented the Pick System. The user then browses product details pages at the merchant's website in step 806, followed by a determination being made in step 808 whether to view a Pick List associated with a product in step 808. If not, then a determination is made in step 854 whether to perform Pick List viewing operations at another merchant's website. If so, then the process is continued, proceeding with step 804. Otherwise, Pick List viewing operations are ended in step 856.

However, if it was determined in step 806 to view a Pick List associated with a product displayed on merchant's product details page, then the viewer selects a Pick List to view in step 810. The selected Pick list is then browsed by the viewer in step 812. In various embodiments, viewing the Pick List provides the viewer a list of the products within the Pick List, including their associated product name, product title, product ratings, and price. In certain embodiments, selecting product listed in the Pick List with a user gesture, such as a mouse click, allows the viewer to add the selected product to their shopping cart as described in greater detail herein.

A determination is then made in step 814 whether to view a different Pick List. If so, then the process is continued, proceeding with step 808. Otherwise, a determination is made in step 816 whether the viewer wishes to view other users who "liked" the selected Pick List. If so, then a list of other users who "liked" the selected Pick list is displayed to the viewer in step 818. In certain embodiments, the Pick System is implemented to allow the viewer to "click through" a listed viewer to access that the viewer's associated Pick Lists, Pick Collages, and Picks user profile. After the viewer has completed viewing the viewers that "liked" the Pick List, or if it was determined in step 816 not to view users that "liked" the Pick List, a determination is made in step 820 whether the viewer wishes to "like" the Pick List. If so, then the viewer performs a user gesture in step 822 to mark the Pick List as a Pick List they "liked."

After the viewer has marked the Pick List in step 822 as a Pick List they "liked," or if it was determined in step 820 not to mark the selected Pick List as a Pick List they "liked," a determination is made in step 824 whether the viewer wishes to "share" the Pick List to a social media site. If so, then the viewer performs social media "sharing" operations familiar to those of skill in the art in step 826 to "share" the Pick List to one or more social media sites (e.g., Facebook®, Twitter® or Pinterest®, etc.). In certain embodiments, social media control buttons are implemented to facilitate the viewer in "sharing" the Pick List to one or more social media sites. In various embodiments, a Picks Detail Page, described in greater detail herein, is displayed to the viewer. In these embodiments, the viewer performs social media "sharing" operations familiar to those of skill in the art in step 826 to socially share the Picks Detail Page to one or more social media sites. In certain embodiments, social media control buttons are implemented to facilitate the viewer in "sharing" the Pick Details Page to one or more social media sites.

After the viewer has performed Pick List social media "sharing" operations in step 826, or if it was determined in step 824 not to "share" the selected Pick List to one or more social media sites, a determination is made in step 828 whether the viewer wishes to view other Pick Lists associated with the creator of the currently selected Pick List. If so, then the viewer views other Pick Lists associated with creator of the currently selected Pick List in step 830. After the viewer has viewed other Pick Lists associated with the creator of the currently selected Pick List step 830, or if it was determined in step 828 not to view other Pick Lists associated with the creator of the currently selected Pick List, a determination is made in step 832 whether the viewer wishes to add one or more products in the selected Pick List to their shopping cart.

If it was determined in step 832 that the viewer did not wish to add one or more products in the Pick List to their shopping cart, then a determination is made in step 848 whether to end Pick List viewing operations. If not, then the process is continued, proceeding with step 806. However, if it was determined in step 832 to add one or more products in the selected Pick List, then a determination is made in step 834 whether the viewer wishes to add all of the products in the selected Pick List to their shopping cart. If so, then they are added in step 836. However, if it was determined in step 834 that the viewer does not wish to add all of the products in the selected Pick List to their shopping cart, then a product in the Pick List is selected in step 838, followed by a determination being made in step 840 whether the selected product has any selectable attributes. If so, then the viewer selects the desired product attributes in step 842 and the selected product is added to the shopping cart in step 844, followed by a determination being made in step 846 whether the viewer wishes to select another product. If so, the process is continued, proceeding with step 838.

Otherwise, or once all products in the selected Pick List are added to the viewer's shopping cart in step 836, or if it was determined in step 832 not to add one or more products to the viewer's shopping cart, then the process is continued, proceeding with step 848. However, if it is determined in step 848 to end Pick List viewing operations, then a determination is then made in step 850 whether there are products in the viewer's shopping cart. If so, then shopping cart checkout operations familiar to those of skill in the art are performed in step 852. Thereafter, or if it was determined in step 850 that there are no products in the viewer's shopping cart, then the process is continued, proceeding with step 854.

Figure 9A:
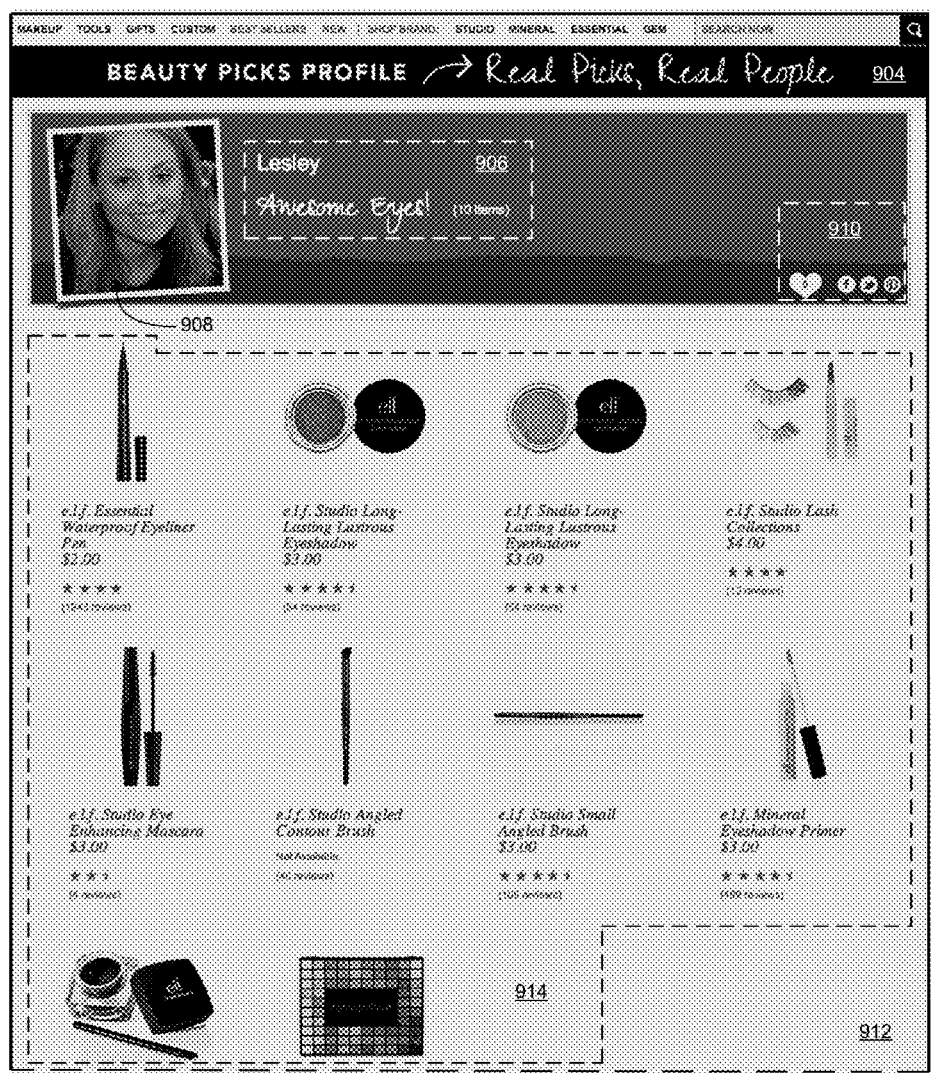
FIGS. 9 and 9b show the display of individual products associated with a Pick List within a UI window.
Figure 9B:
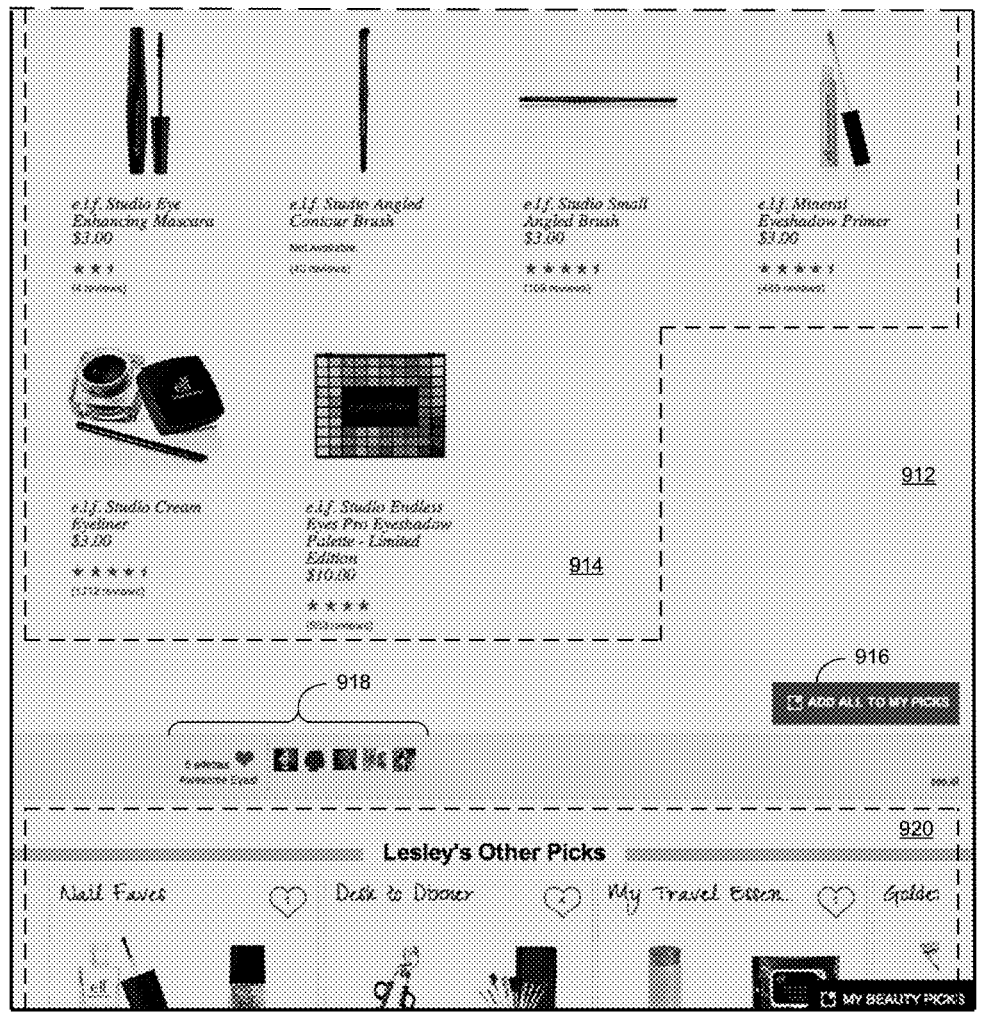

FIGS. 9a and 9b show the display individual products associated with a Pick List within a user interface (UI) window implemented in accordance with an embodiment of the invention. In various embodiments, individual products 914 associated with a Pick List are displayed within a Pick List content UI window 912. In various embodiments, the Picks user profile 904 of the creator of the Pick list is displayed in conjunction with the Pick List content UI window 912. In certain embodiments, the Picks user profile 904 may display the Pick List creator's Pick System screen name 906, their Picks avatar 908, and the number of their "followers" 910 on social media sites. In various embodiments, thumbnail images 918 of the followers are displayed. In one embodiment, the viewer of the Pick List content UI window 912 can add all of the individual products 914 to their own Pick List by selecting the "Add All to My Picks" command button 916 with a user gesture, such as a mouse-click with a cursor. In various embodiments, other Pick Lists 920 created by the creator of the Pick List shown in the Pick List content UI window 912 are displayed. In certain embodiments, the viewer of the other Pick Lists 920 can "click-through" to the other Pick Lists 920 with a user gesture, such as a mouse-click with a cursor.

Figure 10A:
FIGS. 10a and 10b show the display of product details and associated user reviews and recommendations within a UI window.
Figure 10B:
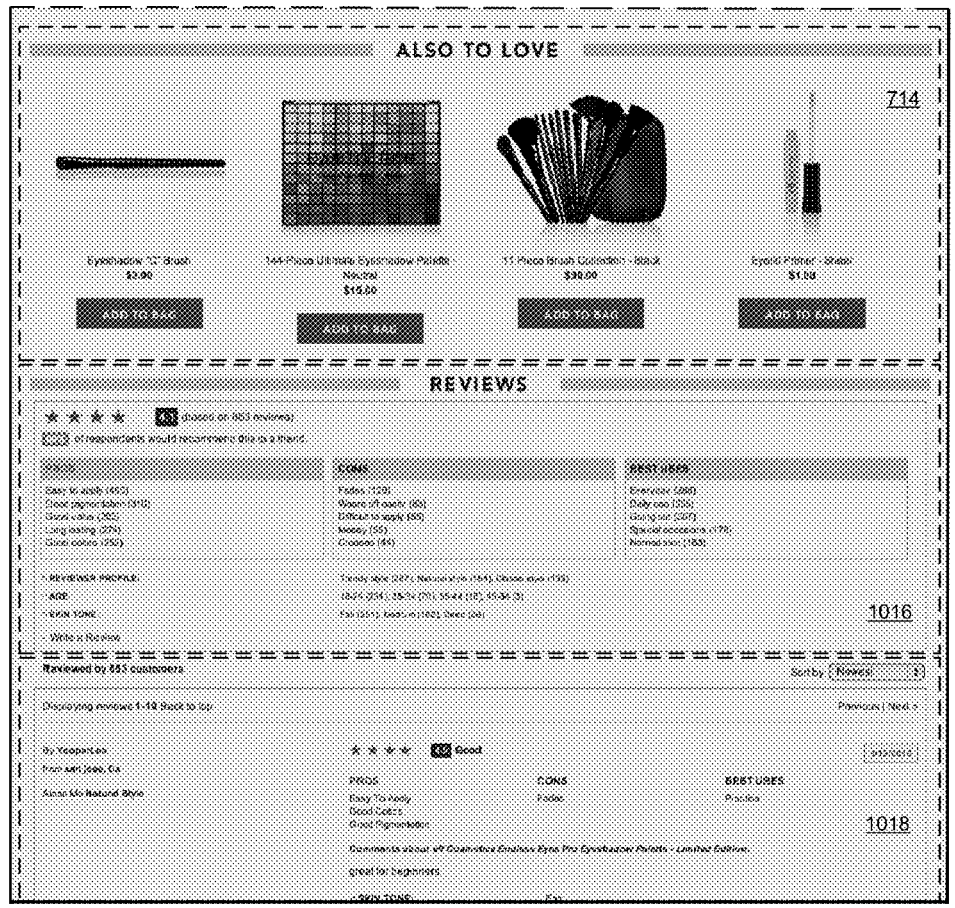

FIGS. 10a and 10b show the display of product details and associated user reviews and recommendations within a user interface (UI) window implemented in accordance with an embodiment of the invention. In various embodiments, Pick System functionality is implemented in a merchant's website. In certain of these embodiments, predetermined Pick System functionality is exposed to the user within a UI window, such as a product details UI window 702 of the merchant's website. In this embodiment, the product details UI window 702 includes a featured product sub-window 704, which includes details associated with an individual featured product (e.g., product description, pricing, etc.), and a suggested products sub-window 714, which includes summary descriptions of a plurality of suggested products. As shown in FIG. 10b, the product details UI window 702 also includes a summarized product review sub-window 1016, which includes summary information associated with users' reviews of the product displayed in the featured product sub-window 704. Likewise, the product details UI window 702 includes an individual product review sub-window 1018, which includes a plurality of individual users' reviews of the product displayed in the featured product sub-window 704.

Referring to FIG. 10a, the featured product sub-window 704 also includes a "Write a Review" command button 706, which allows a Picks User to post a review of the featured product when selected through a user gesture, such as a mouse-click with a cursor. In various embodiments, the resulting product review is displayed within the individual product review sub-window 1018. In certain embodiments, the featured product sub-window 704 includes a plurality of "Share with Friends" command buttons 708. In these embodiments, a Pick System user is provided the ability to socially share the featured product to a predetermined social media site (e.g., Facebook®, Twitter®, etc.) by selecting a corresponding "Share with Friends" command button 708 with a user gesture. In various embodiments, the featured product sub-window 704 includes a modal shopping sub-window 710, described in greater detail herein, which displays different options (e.g., quantity, colors, sizes, styles, etc.) that are available for the featured product. In certain embodiments, the featured product sub-window 704 includes an "Add to Bag" command button 712. In these embodiments, the featured product is added to the user's shopping cart by selecting the "Add to Bag" command button 712 through a user gesture.

Figure 11A:
FIGS. 11a and 11b show a modal shopping sub-window implemented within a UI window.
Figure 11B:
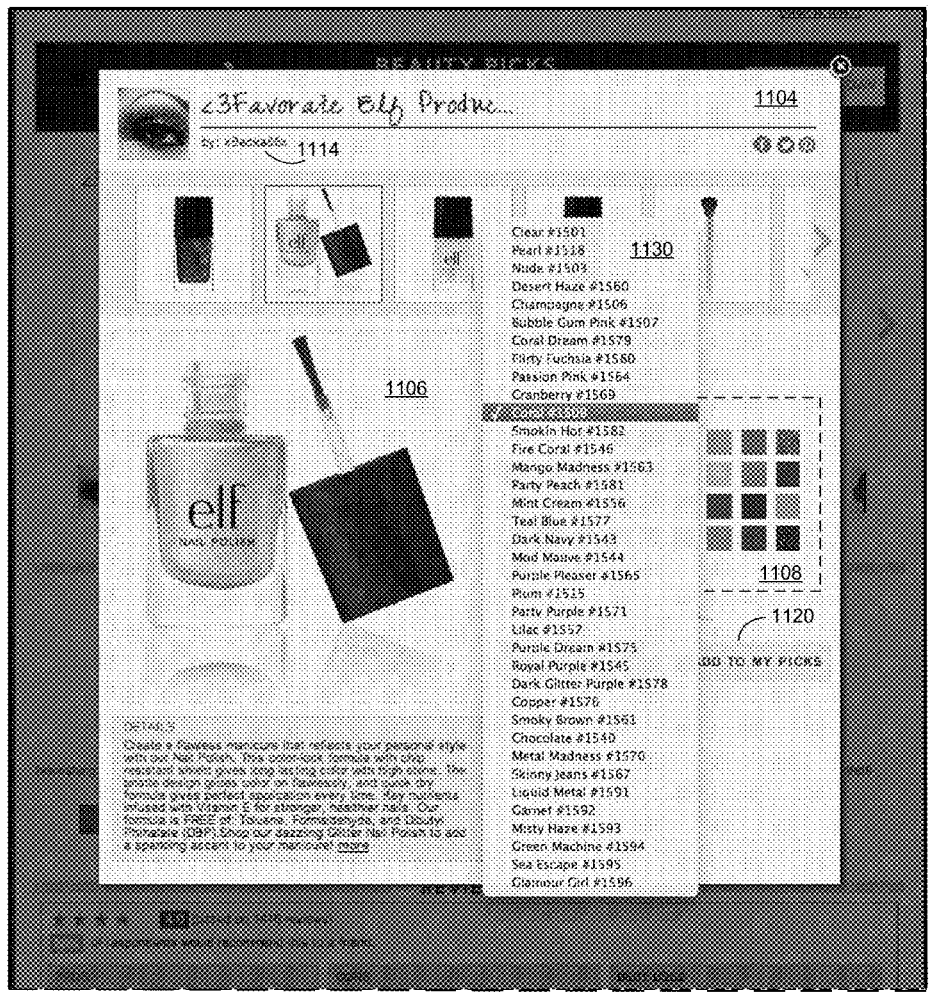

FIGS. 11a and 11b show a modal shopping sub-window implemented within a user interface (UI) window in accordance with an embodiment of the invention. In various embodiments, a modal shopping sub-window 1104 is implemented to allow a viewer of a Pick List to select a product 1106 listed within the Pick List with a user gesture, such as a mouse-click on the "Add to Bag" command button 1112, to add it to their shopping cart. In certain embodiments, the modal shopping sub-window is implemented to allow the viewer of the Pick List to select product variations 1108 (e.g., color, size, etc.) and quantity 1110 before adding their selection to their shopping cart. In various embodiments, the Pick System screen name 1114 of the creator of the Pick List is displayed within the modal shopping sub-window 1104. In certain embodiments, the viewer can "click-through" the Pick System screen name 1114, which hyperlinks the viewer to the Pick List creator's Picks user profile. In various embodiments, a product list drop-down menu 1130 is implemented within the modal shopping sub-window 1104, which lists product options for the selected product 1106.

Figure 12:
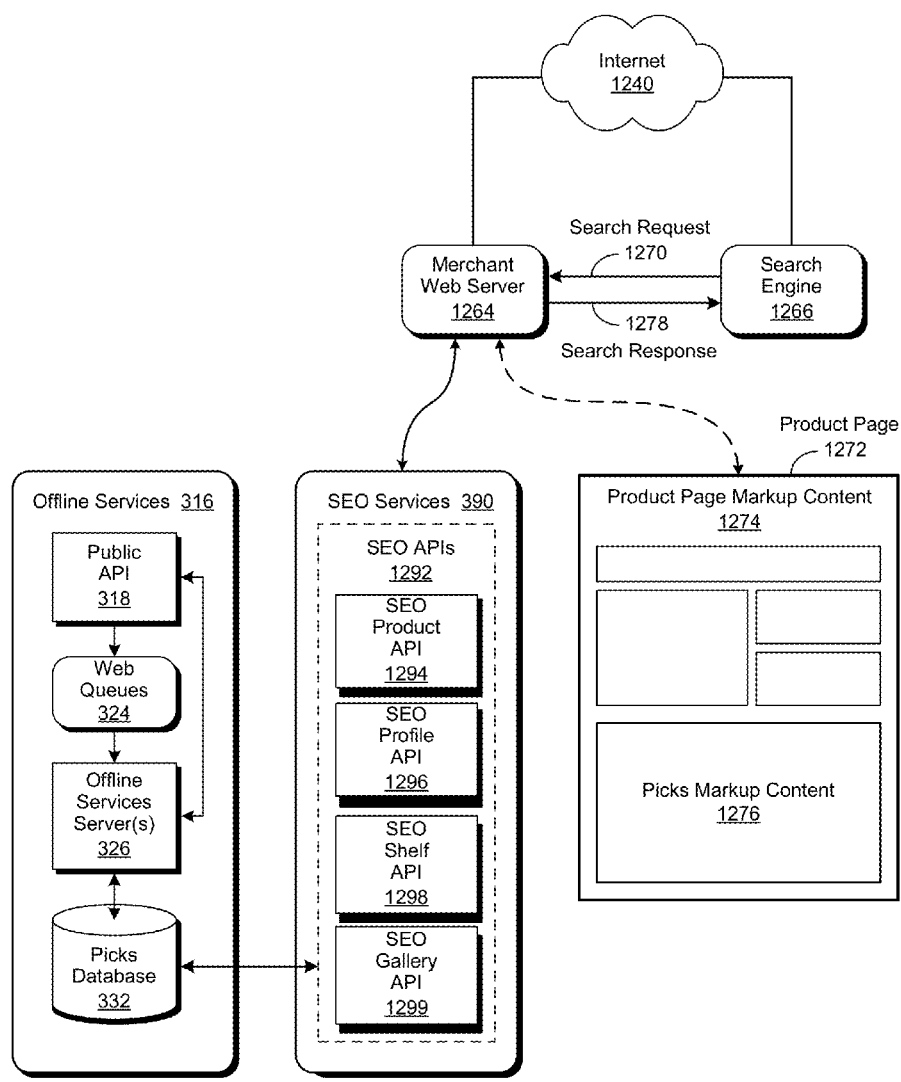
FIG. 12 is a simplified block diagram of a search engine optimization (SEO) application program interface (API) for dynamically injecting Pick content into a merchant's product page in response to a search engine query.

FIG. 12 is a simplified block diagram of a search engine optimization (SEO) application program interface (API) implemented in accordance with an embodiment of the invention for dynamically injecting Pick content into a merchant's product page in response to a search engine query. In this embodiment, an SEO services system 390 includes a set of SEO APIs 1292. In certain embodiments, the set of SEP APIs 1292 include an SEO Product API 1294, an SEO Picks user profile API 1296, an SEO Picks shelf API 1298 and an SEO gallery API 1299.

In various embodiments, a search engine 1266 submits a request for product-related content to a merchant web server 1264, both of which are communicatively coupled to the Internet 1240. In turn, the merchant web server 1264 submits a server-side request to the SEO services system 390, where it is then routed to one or more SEO APIs 1292 for processing. In response, the one or more SEO APIs returns Picks markup content 1276 that is associated with the requested product-related content. In one embodiment the Picks markup content 1276 includes Hypertext Markup Language (HTML) content.

In certain embodiments, the Picks markup content 1276 is returned in a <noscript> block, such that the returned Picks markup content is not visible to a user. In various embodiments, merchants may insert SEO markup into corresponding Picks divs (e.g., via myRelatedCollectinos) In various embodiments, the Picks markup content 1276 returned from predetermined endpoints will mimic data that is typically visible to a user. In various embodiments, the SEO-relevant information returned to the search engine includes:

Textual information (e.g., the title of the Picks, Picks System screen name, Picks creation data, etc.)

Page links (e.g., Picks System user profile page, product page, etc.)

Image URLs (e.g., for products, Pick Collages, Pick System user avatars, etc.)

In one embodiment, the SEO product API 1294 is implemented to provide a snapshot of Picks-related information available for a predetermined product associated with a merchant's product details page. As an example, a product ID is typically a unique identifier in a merchant's product detail page. To further the example, a request for a product ID, and the return of its value, is performed as:

Endpoint: http://static.Marketvinepicks.com/[merchant-id]/product/[product-id]

Response: Picks markup content to be included in a <noscript> block on the product page 1272

In another embodiment, the SEO profile API 1296 is implemented to provide a snapshot of the Picks System user's Picks user profile. In this embodiment, the SEO profile API 1296 uses the Picks System user's Pick screen name, and not the merchant's identifier, as it is the identifier used in the URL for the Picks System user's Picks user profile page into which the Picks markup content 1276 will be inserted:

Endpoint: http://static.Marketvinepicks.com/[merchant-id]/profile/[mv-user-name]

Response: Picks markup content to be included in a <noscript> block on the product page 1272

In another embodiment, the SEO shelf API 1298 is implemented to provide a snapshot of the Picks System user's Picks "shelf" As used herein, a Picks "shelf" refers to a collection of Pick Lists or Pick Collages associated with a Pick System user. In this embodiment, the SEO profile API 1296 uses the Picks System user's Pick screen name, and the Pick System user's Picks shelf name:

Endpoint: http://static.Marketvinepicks.com/[merchant-id]/shelf/[mv-user-name]/[mvshelf-name]

Response: Picks markup content to be included in a <noscript> block on the product page 1272

In various embodiments, the merchant web server then combines the requested product-related content, such as product page markup content 1274, with the returned Picks markup content 1276 to generate a product page 1272, which is then returned in a search response message 1278 to the search engine. The search engine 1266 then indexes the combined page markup content 1274 and Picks markup content 1276. From the foregoing, it will be apparent to skilled practitioners of the art that SEO benefits are realized in various embodiments from the dynamic injection of the Picks markup content 1276 into the product page 1272.

Figure 13:
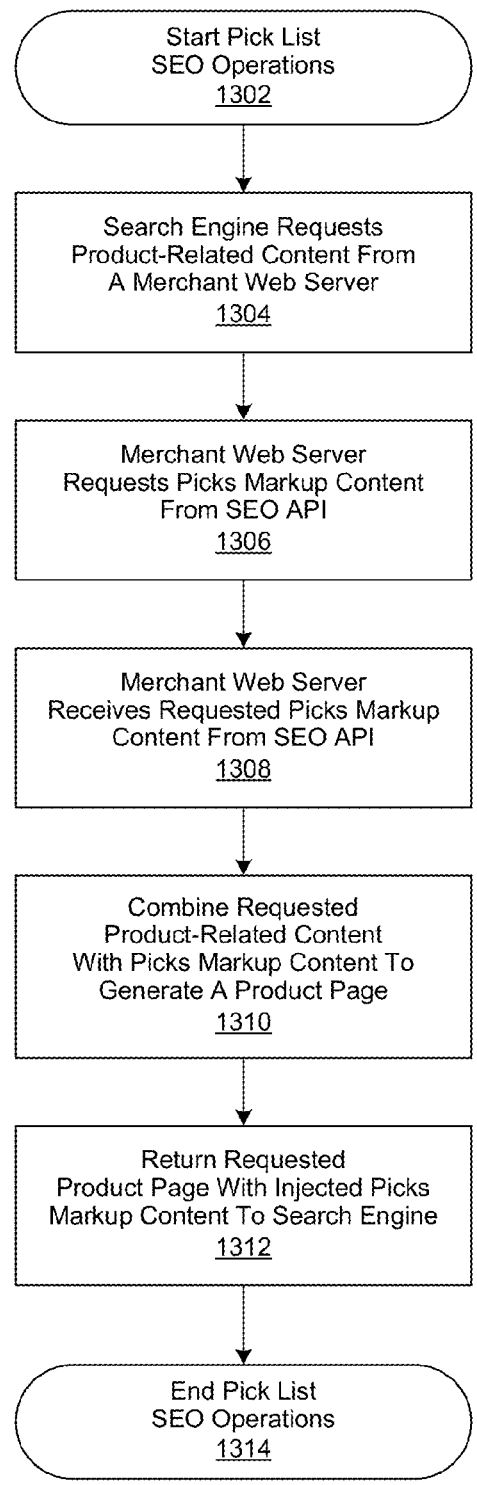
FIG. 13 is a generalized flowchart of the performance of SEO API operations for dynamically injecting Pick content into a merchant's product page in response to a search engine query.

FIG. 13 is a generalized flowchart of the performance of search engine optimization (SEO) application program interface (API) operations implemented in accordance with an embodiment of the invention for dynamically injecting Pick content into a merchant's product page in response to a search engine query. In this embodiment, Pick List SEO operations are begun in step 1302, followed by a search engine submitting a request for product-related content (e.g., a product page) to a merchant web server in step 1304.

In turn, the merchant web server submits a server-side request through an SEO services interface in step 1306 to one or more SEO APIs for processing. In response, the one or more SEO APIs returns Picks markup content that is associated with the requested product-related content in step

1308. In one embodiment the Picks markup content 1276 includes Hypertext Markup Language (HTML) content.

The merchant web server then combines the requested product-related content, such as product page markup content, with the returned Picks markup content to generate a product page in step 1310. The product page, which includes the dynamically injected Picks markup content, is then returned in a search response message 1278 to the search engine in step 1312 where it is indexed. Pick List SEO operations are then ended in step 1314.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for automating the provision of social media product recommendations in an electronic commerce environment, comprising:
   receiving a request from a search engine for content related to a product, the request received by a web server associated with a provider of the product;
   processing the request to generate a server-side request for Picks markup content associated with the product, the Picks markup content comprising markup content for provision to a merchant system to enable the merchant system to combine product-related content and Picks markup content to generate a product page, the Picks markup content comprising Hypertext Markup Language (HTML) content, the Picks markup content comprising markup content for creating Pick Lists via a Pick System, each Pick List comprising a respective pictorial grouping of products that a user has selected, assembled and named via the Pick System, the Pick System enabling the user to create and manage collections of favorite products using a Pick List;
   providing the server-side request to a search engine optimization (SEO) application program interface (API), the SEO API comprising an SEO product API, the SEO product API providing a snapshot of Picks-related information available for a predetermined product;
   receiving the Picks markup content from the SEO API;
   processing the Picks markup content with markup content associated with the product to generate a set of consolidated markup content;
   providing the set of consolidated markup content to the search engine; and
   configuring a source web page of a merchant, the source web page comprising the product page, the configuring the source web page using source web page markup content and source script code to receive consolidated Pick System script code, the configuring dynamically injecting Picks markup content to the source web page so as to present the Pick List via the web page of the merchant.

2. The computer-implementable method of claim 1, wherein the SEO API comprises at least one member of the set of:
   an SEO Picks user profile API;
   an SEO Picks shelf API; and
   an SEO Picks gallery API.

3. The computer-implementable method of claim 1, wherein the Picks markup content comprises at least one member of the set of:
   text data;
   page link data;
   image link data; and,
   additional metadata.

4. The computer-implementable method of claim 3, wherein:
   the page link data and the image link data comprise a Uniform Resource Locator (URL).

5. The computer-implementable method of claim 1, wherein:
   the Picks markup content provided by the SEO API is returned from an endpoint.

6. The computer-implementable method of claim 5, wherein:
   the endpoint comprises a Uniform Resource Locator (URL).

7. The computer-implementable method of claim 6, wherein:
   the set of consolidated markup content is indexed by the search engine to generate a set of indexed markup content.

8. The computer-implementable method of claim 6, wherein:
   the set of consolidated markup content is provided to the search engine as a product web page.

9. The computer-implementable method of claim 8, wherein:
   the set of consolidated markup content is provided from a server at a remote location.

10. The computer-implementable method of claim 9, wherein:
    the set of consolidated markup content is provided by a service provider on an on-demand basis.

11. A system comprising:
a processor;
a data bus coupled to the processor; and
a non-transitory, computer-readable storage medium embodying computer program code for automating the provision of social media product recommendations in an electronic commerce environment, the non-transitory, computer-readable storage medium being coupled to the data bus, the computer program code interacting with a plurality of computer operations and comprising instructions executable by the processor and configured for:
receiving a request from a search engine for content related to a product, the request received by a web server associated with a provider of the product;
processing the request to generate a server-side request for Picks markup content associated with the product, the Picks markup content comprising markup content for provision to a merchant system to enable the merchant system to combine product-related content and Picks markup content to generate a product page, the Picks markup content comprising Hypertext Markup Language (HTML) content, the Picks markup content comprising markup content for creating Pick Lists via a Pick System, each Pick List comprising a respective pictorial grouping of products that a user has selected, assembled and named via the Pick System, the Pick System enabling the user to create and manage collections of favorite products using a Pick List;
providing the server-side request to a search engine optimization (SEO) application program interface (API), the SEO API comprising an SEO product API, the SEO product API providing a snapshot of Picks-related information available for a predetermined product;
receiving the Picks markup content from the SEO API;
processing the Picks markup content with markup content associated with the product to generate a set of consolidated markup content;
providing the set of consolidated markup content to the search engine; and,
configuring a source web page of a merchant, the source web page comprising the product page, the configuring the source web page using source web page markup content and source script code to receive consolidated Pick System script code, the configuring dynamically injecting Picks markup content to the source web page so as to present the Pick List via the web page of the merchant.

12. The system of claim 11, wherein the SEO API comprises at least one member of the set of:
an SEO Picks user profile API;
an SEO Picks shelf API; and
an SEO Picks gallery API.

13. The system of claim 11, wherein the Picks markup content comprises at least one member of the set of:
text data;
page link data;
image link data; and,
additional metadata.

14. The system of claim 13, wherein:
the page link data and the image link data comprise a Uniform Resource Locator (URL).

15. The system of claim 11, wherein:
the Picks markup content provided by the SEO API is returned from an endpoint.

16. The system of claim 15, wherein:
the endpoint comprises a Uniform Resource Locator (URL).

17. The system of claim 16, wherein:
the set of consolidated markup content is indexed by the search engine to generate a set of indexed markup content.

18. The system of claim 16, wherein:
the set of consolidated markup content is provided to the search engine as a product web page.

19. The system of claim 18, wherein:
the set of consolidated markup content is provided from a server at a remote location.

20. The system of claim 19, wherein:
the set of consolidated markup content is provided by a service provider on an on-demand basis.

21. A computer-implementable method for automating the provision of social media product recommendations in an electronic commerce environment, comprising:
receiving a request from a search engine for content related to a product, the request received by a web server associated with a provider of the product;
processing the request to generate a server-side request for Picks markup content associated with the product, the Picks markup content comprising markup content for provision to a merchant system to enable the merchant system to combine product-related content and Picks markup content to generate a product page, the Picks markup content comprising Hypertext Markup Language (HTML) content, the Picks markup content comprising markup content for creating Pick Lists via a Pick System, each Pick List comprising a respective pictorial grouping of products that a user has selected, assembled and named via the Pick System, the Pick System enabling the user to create and manage collections of favorite products using a Pick List;
providing the server-side request to a search engine optimization (SEO) application program interface (API), the SEO API comprising an SEO product API, an SEO Picks user profile API; and an SEO Picks shelf API; the SEO product API providing a snapshot of Picks-related information available for a predetermined product, the SEO Picks user profile API providing a snapshot of a Picks user profile of the user of the Pick System, the SEO Picks shelf API providing a snapshot of a shelf of the user of the Pick system, the shelf comprising a collection of Pick Lists associated with the user of the Pick System;
receiving the Picks markup content from the SEO API;
processing the Picks markup content with markup content associated with the product to generate a set of consolidated markup content;
providing the set of consolidated markup content to the search engine; and
configuring a source web page of a merchant, the source web page comprising the product page, the configuring the source web page using source web page markup content and source script code to receive consolidated Pick System script code, the configuring dynamically injecting Picks markup content to the source web page so as to present the Pick List via the web page of the merchant.

* * * * *